(12) United States Patent
Kalsi et al.

(10) Patent No.: US 10,318,834 B2
(45) Date of Patent: Jun. 11, 2019

(54) OPTIMIZED IMAGE FEATURE EXTRACTION

(71) Applicant: INTEL CORPORATION, Santa Clara, CA (US)

(72) Inventors: Gurpreet S. Kalsi, Bangalore (IN); Om J. Omer, Bangalore (IN); Biji George, Bangalore (IN); Gopi Neela, Bangalore (IN); Dipan Kumar Mandal, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 15/582,945

(22) Filed: May 1, 2017

(65) Prior Publication Data

US 2018/0314903 A1 Nov. 1, 2018

(51) Int. Cl.
*G06K 9/00* (2006.01)
*G06K 9/46* (2006.01)
*G06F 17/10* (2006.01)

(52) U.S. Cl.
CPC ......... *G06K 9/00973* (2013.01); *G06F 17/10* (2013.01); *G06K 9/4647* (2013.01); *G06K 9/4671* (2013.01)

(58) Field of Classification Search
CPC ....... G06F 17/00; G06F 21/32; G06T 7/0083; G06T 2207/10016; G11B 27/28; G06K 9/00744; G06K 9/4671; G06K 9/0061; G06K 9/00617; G06K 9/4609; G06K 9/48; G06K 9/00973; G06K 9/4647
See application file for complete search history.

(56) References Cited

U.S. PATENT DOCUMENTS

| 9,299,364 B1 * | 3/2016 | Pereira ..................... G10L 25/51 |
| 9,378,420 B1 * | 6/2016 | Mundhenk ........... G06K 9/4676 |
| 2012/0224769 A1 * | 9/2012 | White ................ G06K 9/00362 382/165 |
| 2013/0182894 A1 * | 7/2013 | Kim ........................ G06T 7/246 382/103 |

(Continued)

OTHER PUBLICATIONS

Hinterstoisser, S., et.al.: "Dominant Orientation Templates for Real-Time Detection of Texture-Less Objects", 2010 IEEE Computer Society Conference Vision and Pattern Recognition, Jun. 13-18, 2010, 8 pages, IEEE, Piscataway, NJ, USA.

(Continued)

*Primary Examiner* — Amir Alavi
(74) *Attorney, Agent, or Firm* — Grossman, Tucker, Perreault & Pfleger, PLLC

(57) ABSTRACT

One embodiment provides an image processing circuitry. The image processing circuitry includes a feature extraction circuitry and an optimization circuitry. The feature extraction circuitry is to determine a feature descriptor based, at least in part, on a feature point location and a corresponding scale. The optimization circuitry is to optimize an operation of the feature extraction circuitry. Each optimization is to at least one of accelerate the operation of the feature extraction circuitry, reduce a power consumption of the feature extraction circuitry and/or reduce a system memory bandwidth used by the feature extraction circuitry.

19 Claims, 15 Drawing Sheets

(56) References Cited

U.S. PATENT DOCUMENTS

| | | | | |
|---|---|---|---|---|
| 2015/0146917 | A1* | 5/2015 | Bernal | G06K 9/00771 |
| | | | | 382/103 |
| 2015/0154456 | A1* | 6/2015 | Pau | G06K 9/00744 |
| | | | | 382/201 |
| 2018/0082043 | A1* | 3/2018 | Witchey | G06F 19/00 |
| 2018/0189972 | A1* | 7/2018 | Humbert | G06T 7/70 |
| 2018/0211092 | A9* | 7/2018 | Derakhshani | G06K 9/0061 |

OTHER PUBLICATIONS

Hassaballah, M., et.al.: "Image Features Detection, Description and Matching", Studies in Computational Intelligence, Image Feature Detectors and Descriptors: Foundations and Applications, 2016, pp. 11-45, vol. 630, Springer International Publishing, Switzerland.

Calonder, M., et.al.: "BRIEF: Binary Robust Independent Elementary Features", ECCV '10 Proceedings of the 11th European conference on Computer vision: Part IV, Lecture Notes in Computer Science, Sep. 5, 2010, 14 pages, Springer-Verlag Berlin, Heidelberg, Germany.

Leutenegger, S., et.al.: "BRISK: Binary Robust Invariant Scalable Keypoints", 2011 IEEE International Conference on Computer Vision, Nov. 6-13, 2011, Jan. 26, 2012, 8 pages, IEEE, Piscataway, NJ, USA.

Alahi, A., et.al.: "FREAK: Fast Retina Keypoint", 2012 IEEE Conference on Computer Vision and Pattern Recognition (CVPR), Jun. 16-21, 2012, Jul. 12, 2012, 8 pages, IEEE, Piscataway, NJ, USA.

Rublee, E., et.al.: "ORB: An Efficient Alternative to SIFT or SURF", 2011 IEEE International Conference on Computer Vision (ICCV), Nov. 6-13, 2011, Jan. 12, 2012, 8 pages, IEEE, Piscataway, NJ, USA.

Viola, P., et al.: "Rapid Object Detection using a Boosted Cascade of Simple Features", Accepted Conference on Computer Vision and Pattern Recognition 2001, 2001 IEEE Computer Society Conference on Computer Vision and Pattern Recognition, Dec. 8-14, 2001, 9 pages, IEEE, Piscataway, NJ, USA.

Rosten, E., et al.: "Machine learning for high-speed corner detection", published in Proceedings of the European Conference on Computer Vision (ECCV), 2006, 14 pages.

Mair, E., et al.: "Adaptive and Generic Corner Detection Based on the Accelerated Segment Test", published in ECCV, 2010, 14 pages.

* cited by examiner

OPTIMIZED IMAGE FEATURE EXTRACTION

FIELD

The present disclosure relates to an image feature, in particular to, image feature extraction.

BACKGROUND

Computer vision applications such as augmented reality, virtual reality, mixed reality, robotics, unmanned aircraft (e.g., drones), computational imaging, etc., utilize object recognition, pattern recognition, tracking and/or three-dimensional reconstruction techniques. Associated image processing may include feature detection and feature extraction to support recognition and/or reconstruction operations. Feature detection includes identifying features, e.g., corners, in a captured image. Feature extraction includes determining one or more image feature descriptors related to the identified features. Determining image feature descriptors may be computationally intensive, may result in significant latency and may consume significant energy.

Some computer vision applications may be implemented on portable and/or small form factor devices such as smart phones, tablets and/or Internet of things (IoT) devices. Consumption of device resources (e.g., processing, power, memory bandwidth) and associated latencies may be relatively more significant on such portable and/or small form factor devices.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to an image feature extraction circuitry. An apparatus, method and/or system may include image processing circuitry that includes feature extraction circuitry and optimization circuitry. The feature extraction circuitry is configured to determine a feature descriptor based, at least in part, on a feature point location and a scale. The optimization circuitry is configured to optimize an operation of the feature extraction circuitry. For example, optimization circuitry may configure one or more elements of feature extraction circuitry to implement, e.g., utilize, respective optimizations. Each optimization is configured to at least one of accelerate the operation of the feature extraction circuitry, reduce power consumption of the feature extraction circuitry and/or reduce a memory bandwidth used by the feature extraction circuitry.

Optimizations may include, but are not limited to, determining each integral image value utilizing a register, a line buffer and two addition operations (e.g., two adder circuitries); defining rectangular, e.g., square, sample point regions; box filter smoothing of sample point regions; exploiting spatial locality between a plurality of feature points; performing selected arithmetic operations utilizing intermediate floating-point precision; predicting an adjusted sample point location and sorting sample point pairs prior to descriptor bit determination. In some embodiments, optimizations may include selective local buffering ("smart caching"). Selective local buffering is configured to selectively store integral image values in an image cache for use during feature descriptor determination operations. Determination of one or more feature descriptors may thus be optimized, as will be described in more detail below.

Figure 1:
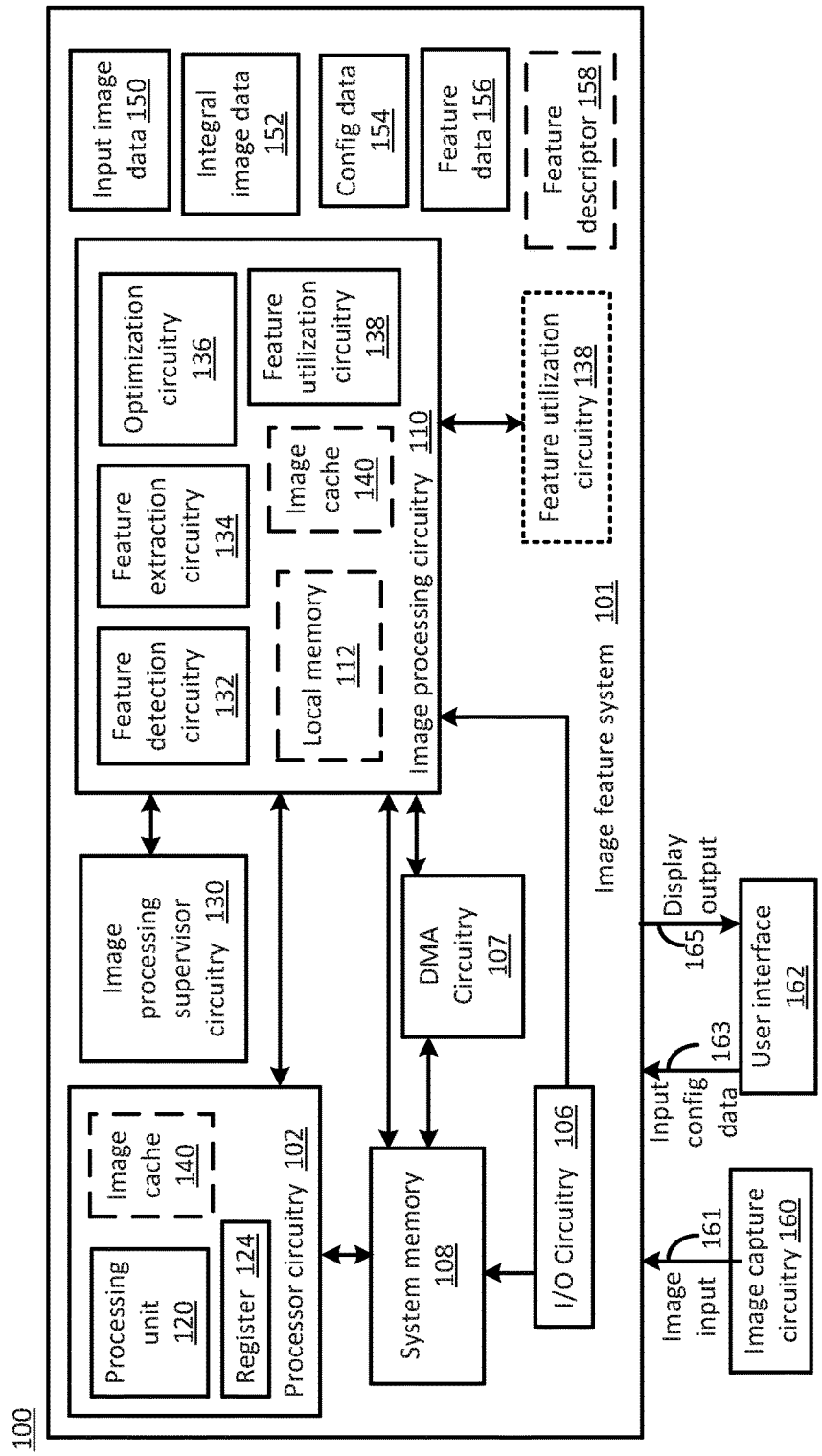
FIG. 1 illustrates a functional block diagram of a system including an image feature system, consistent with several embodiments of the present disclosure.

FIG. 1 illustrates a functional block diagram of a system 100 including an image feature system 101, consistent with several embodiments of the present disclosure. System 100 further includes an image capture circuitry 160 and a user interface 162. Image capture circuitry 160 may include, but is not limited to, a camera (e.g., a still camera and/or a video camera) and/or a storage device (e.g., a hard disk drive, a solid-state drive, a flash drive, a removable storage medium, etc.). User interface 162 may include a user input device (e.g., keypad, keyboard, mouse, touch sensitive display, touch screen, etc.) and/or an output device (e.g., a display, a monitor, etc.). Image capture circuitry 160 is configured to capture an image (e.g., a scene) and to provide a digital representation of the captured image, e.g., image input 161, to image feature system 101. User interface 162 is configured to facilitate selection and/or reception of configuration data by and/or from a user. User interface 162 is further configured to provide input configuration data 163 to the image feature system 101. User interface 162 may further receive display output 165 from the image feature system 101. User interface 162 may then be configured to display the display output 165 to the user.

Image feature system 101 is configured to receive input configuration data 163. Input configuration data 163 may include, but is not limited to, one or more of a feature extraction technique type identifier, a number of bits in a feature descriptor, a number of sample points, a location of each sample point and a sample point size. The sample point size is related to a size of a sample point region associated with each sample point. For example, for a circular sample point region, the sample point size corresponds to a radius of the circular sample point region. Input configuration data 163 may further include a number of pairs of sample points and sample point pairs selected for orientation determination. Input configuration data 163 may further include a number of pairs of sample points and sample point pairs selected for feature descriptor determination. Input configuration data 163 may further include a first two-dimensional array of angle values and associated sine functions of those angle values, a second two-dimensional array of angle values and associated cosine functions of those angle values.

Thus, the feature extraction technique may be user-selectable and operations of feature extraction circuitry may be configurable by a user.

Image feature system 101 includes a processor circuitry 102, an input/output (I/O) circuitry 106, a direct memory access (DMA) circuitry 107, a system memory 108, an image processing circuitry 110 and an image processing supervisor circuitry 130. I/O circuitry 106 may be configured to receive an input to image feature system 101 and to provide an output (e.g., data) from image feature system 101. I/O circuitry is configured to receive input configuration data 163 and store the received data to e.g., system memory 108. I/O circuitry 106 may be configured to store the first and second two-dimensional arrays of angle values and corresponding trigonometric functions to system memory 108. For example, the arrays may be stored as lookup tables (LUTs), e.g., LUT_Sine(Sin_index) and LUT_Cosine(Cos_index) for index values (Sin_index, Cos_index) between zero and one. I/O circuitry 106 is further configured to store the received input image 161 to, e.g., system memory 108. DMA circuitry 107 is configured to manage DMA operations between system memory 108 and image processing circuitry 110. The system memory 108 may be configured to store data and/or a feature descriptor, as described herein.

Processor circuitry 102 may include, but is not limited to, one or more of a general purpose processor, a special purpose processor (e.g., a graphics processing unit, a digital signal processing unit, a vector processing unit, etc.) and/or a microcontroller (e.g., a finite state machine microcontroller). Processor circuitry 102 may include one or more processing units, e.g., processing unit 120, and one or more registers, e.g., register 124. For example, processor circuitry 102 may correspond to a single core or a multi-core general purpose processor, such as those provided by Intel® Corp., etc. In some embodiments, processor circuitry 102 may include image cache 140.

Image processing circuitry 110 includes feature detection circuitry 132, feature extraction circuitry 134, optimization circuitry 136 and feature utilization circuitry 138. In some embodiments, feature utilization circuitry 138 may be coupled to image processing circuitry 110. In some embodiments, image processing circuitry 110 may include a local memory 112. In some embodiments, image processing circuitry 110 may include image cache 140.

Image feature system 101 may further include one or more of input image data 150, integral image data 152, configuration data 154 and/or feature data 156. Image feature system 101 may further include one or more feature descriptors, e.g., feature descriptor 158. Configuration data 154 may thus include received input configuration data 163, as described herein. For example, input image data 150, integral image data 152, configuration data 154 and/or feature data 156 may be stored to system memory 108. In another example, at least a portion of input image data 150, integral image data 152, configuration data 154 and/or feature data 156 may be stored to local memory 112. In some embodiments, at least a portion of integral image data 152 may be stored to image cache 140. For example, I/O circuitry 106 may be configured to receive input image 161 from image capture circuitry 160 and to store the input image data 150 to system memory 108 and/or local memory 112. In another example, I/O circuitry 106 may be configured to provide display output 165 to user interface 162. I/O circuitry 106 may be configured to store received input configuration data 163 to configuration data 154.

Image feature system 101 is configured to receive the image input 161, as described herein. The input image 161 may correspond to an array (e.g., two-dimensional) of pixel values that includes at least a pixel intensity value. Each pixel location may be identified by, for example, a pair of indices including a column index and a row index. Thus, the input image 161 may correspond to an array of digital values with each digital value representing a pixel intensity. The array of digital values may then correspond to input image data 150.

Image processing circuitry 110 is configured to perform one or more image processing operations on the input image data 150. For example, image processing operations may include, but are not limited to, feature detection, feature extraction and/or feature utilization. Feature utilization may include, but is not limited to, operations associated with object classification, object recognition, pattern recognition, tracking, 3-D reconstruction, etc. The image processing operations performed may be selected based, at least in part, on input configuration data 163.

Image feature system 101 may further include image processing supervisor circuitry 130. Image processing supervisor circuitry 130 may be configured to supervise, i.e., manage, operations of image processing circuitry 110, as described herein. Image processing supervisor circuitry 130 may be further configured to receive an output (e.g., a feature descriptor) of image processing circuitry 110.

Feature detection circuitry 132 may be configured to identify one or more features in the input image based, at least in part, on the input image data 150. Features may generally include corners and/or edges. For example, feature detection circuitry 132 may comply and/or be compatible with a FAST (Features from Accelerated Segment Test) technique (e.g., E. Rosten and T. Drummond, "Machine learning for high-speed corner detection", published in Proceedings of the European Conference on Computer Vision (ECCV) in 2006). In another example, feature detection circuitry 132 may comply and/or be compatible with an AGAST (Adaptive Generic Accelerated Segment Test) technique (e.g., E. Mair, et al., "Adaptive and Generic Corner Detection Based on the Accelerated Segment Test", published in ECCV in 2010).

Feature data 156 associated with each identified feature may then be stored to system memory 108 and/or local memory 112, by image processing supervisor circuitry 130 and/or feature detection circuitry 132. Feature data 156 may include, but is not limited to a feature identifier, a feature point location and a feature point scale. Each identified feature may correspond to a two-dimensional region ("feature patch") in the input image data 150 that includes an array of pixels. The feature point location may correspond to a center pixel location of the feature patch. The feature point scale corresponds to a radius of a change in intensity values of pixels around a feature point. The feature point scale defines the feature patch size.

Feature extraction circuitry 134 is configured to determine a respective binary feature descriptor for each identified feature. The feature descriptors may include one or more binary values, e.g., bits, related to a comparison of selected pairs of image intensities. For example, feature extraction circuitry 134 may comply and/or be compatible with a feature extraction technique. Feature extraction techniques may include, but are not limited to, BRISK (e.g., S. Leutenegger, et al., BRISK: Binary Robust Invariant Scalable Keypoints, 2011 IEEE (Institute of Electrical and Electronic Engineers) International Conference on Computer Vision (ICCV), published January 2012), BRIEF (e.g., M. Calonder, et al., BRIEF: Binary Robust Independent Elementary Features, Computer Vision—ECCV (European Conference on Computer Vision), published in 2010), ORB (Oriented Fast and Rotated BRIEF) (e.g., E. Rublee, et al., ORB: An efficient alternative to SIFT (Scale Invariant Feature Transform) or SURF (Speed-up Robust Feature), 2011 IEEE International Conference on Computer Vision (ICCV), published January 2012) and/or FREAK (e.g., A. Alahi, et al., FREAK: Fast Retina Keypoint, 2012 IEEE Conference on Computer Vision and Pattern Recognition, published July 2012), etc.

Optimization circuitry 136 is configured to optimize an operation of the feature extraction circuitry 134. Each optimization is configured to at least one of accelerate the operation of the feature extraction circuitry 134, reduce power consumption of the feature extraction circuitry 134 and/or reduce a system memory bandwidth used by the feature extraction circuitry 134, as will be described in more detail below.

Feature utilization circuitry 138 is configured to receive one or more feature descriptors from, e.g., feature extraction circuitry 134. Feature utilization circuitry 138 may then utilize the received feature descriptors to perform one or more of object classification, object recognition, pattern recognition, tracking and/or three-dimensional reconstruction. For example, feature utilization circuitry 138 may be configured to identify one or more elements included in the input image based, at least in part, on the received feature descriptors. In another example, feature utilization circuitry 138 may be configured to classify one or more features based, at least in part, on the feature descriptors. Output of feature extraction circuitry 134 may then be provided to image processing supervisor circuitry 130 and/or to I/O circuitry 106 for provision to user interface 162.

Thus, image feature system 101 may receive input image 161. The input image 161 may be stored as corresponding input image data 150. Feature detection circuitry 132 may be configured to identify one or more features, e.g., feature points, in the input image data 150. Feature extraction circuitry 134 may be configured to determine one or more feature descriptors based, at least in part, on the identified feature points and based at least in part on a feature scale. Feature utilization circuitry 138 may then be configured to perform, e.g., object recognition operations, based, at least in part, on the feature descriptors, and to provide an output.

Figure 2:
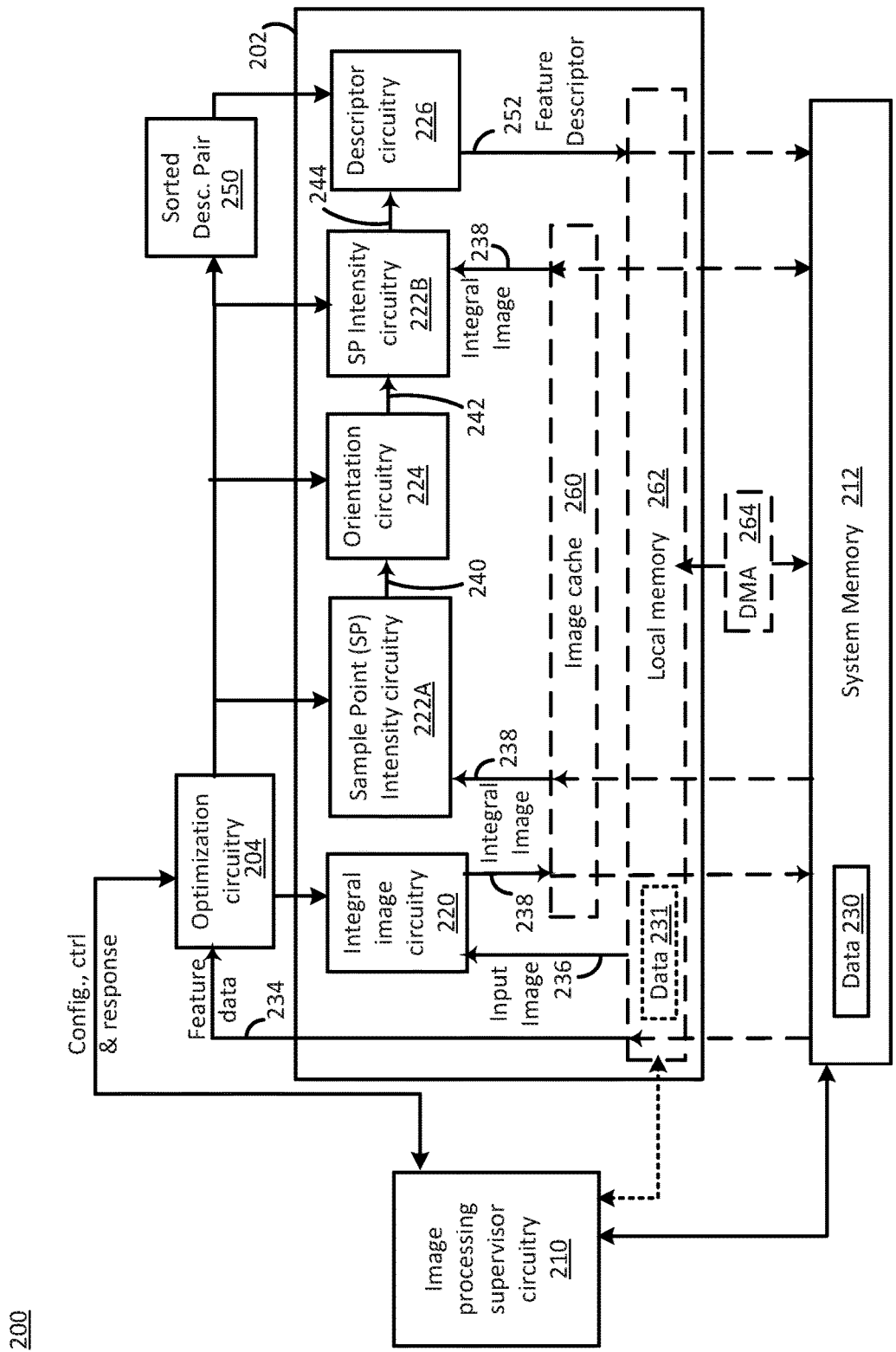
FIG. 2 illustrates a functional block diagram of an image processing subsystem consistent with several embodiments of the present disclosure.

FIG. 2 illustrates a functional block diagram of an image processing subsystem 200, consistent with several embodiments of the present disclosure. The image processing subsystem 200 includes a feature extraction circuitry 202, an optimization circuitry 204, an image processing supervisor circuitry 210 and a system memory 212. In some embodiments, image processing subsystem 200 may further include an image cache 260. In these embodiments, the image cache 260 may be included in or coupled to feature extraction circuitry 202. In some embodiments, feature extraction circuitry 202 may include a local memory 262. In these embodiments, image processing subsystem 200 may include a DMA 264. Image processing supervisor circuitry 210 corresponds to image processing supervisor circuitry 130, system memory 212 corresponds to system memory 108, image cache 260 corresponds to image cache 140 and local memory corresponds to local memory 112, of FIG. 1. Feature extraction circuitry 202 is one example of feature extraction circuitry 134 of FIG. 1.

Feature extraction circuitry 202 includes integral image circuitry 220, at least one of sample point (SP) intensity circuitry 222A and/or SP intensity circuitry 222B, orientation circuitry 224, and descriptor circuitry 226. In an embodiment, SP intensity circuitry 222A and SP intensity circuitry 222B may be a same SP intensity circuitry. SP intensity circuitry 222A and SP intensity circuitry 222B are drawn as two functional blocks for ease of illustration.

System memory 212 is configured to store data 230. Local memory 262 is configured to store data 231. Data 231 may correspond to or may be a subset of data 230. Elements of data 230 and/or elements of data 231 may be transferred between local memory 262 and system memory 212 by DMA via DMA 264. Data 230 and/or data 231 may include one or more of input image data 150, integral image data 152, configuration data 154 and/or feature data 156 and/or feature descriptor 158 of FIG. 1. Image processing supervisor circuitry 210 may be configured to store elements of data 230, 231 to system memory 212 and/or local memory 262 and/or retrieve elements of data 230, 231 from system memory 212 and/or local memory 262.

Input image data 230 may correspond to a digital representation of an image configured as a two-dimensional array of pixels ($P_{i,j}$), where i corresponds to a column (horizontal direction) index and j corresponds to a row (vertical direction) index of a matrix of input image data. Each pixel, $P_{i,j}$, may have a pixel intensity value, $I(P_{i,j})$. A range of pixel intensity values is related to a number of bits per pixel. For example, for n bits per pixel, the corresponding range of pixel intensity values is zero to $2^{n-1}$. Thus, for 8 intensity bits per pixel, the range of intensity values is zero to 255.

Image processing supervisor circuitry 210 may be configured to provide feature configuration data and/or control information to optimization circuitry. Image processing supervisor circuitry 210 may be further configured to receive a response from optimization circuitry 204. The feature configuration data and/or control information may be related to the feature extraction technique, e.g., the feature extraction technique identifier, and may be based, at least in part, on the input configuration data 163. Feature extraction techniques may include, but are not limited to, FREAK, BRISK, BRIEF and ORB, as described herein. Feature configuration data may include, but is not limited to, a sample point size, a sample point location, sample point indexes for each pair of sample points (where each pair of sample points corresponds to a descriptor bit) and a number of sample point pairs involved in each orientation determination, as will be described in more detail below. A sample point location is a location of a sample point relative to a corresponding feature point location. Sample point location may thus include a distance (e.g., a radius) from the feature point and a direction (e.g., an angle from a reference on a circle centered at the feature point that has the corresponding radius). The feature configuration data may include a subset of configuration data 154 of FIG. 1.

Optimization circuitry 204 is configured to retrieve feature data 234 from system memory 212 and/or local memory 262. Feature data 234 may correspond to feature data 156 of FIG. 1. For example, feature data 234 may include a feature point location and corresponding scale (feature point scale) for each feature point identified by feature detection circuitry 132. The scale of a feature point corresponds to a radius of a change in intensity values of pixels around a feature point. The scale of a feature point defines the feature patch size. Optimization circuitry 240 is configured to scale (e.g., adjust, by multiplying) a sample point location (i.e., radius) and a sample point size based, at least in part, on the feature point scale.

Feature extraction circuitry 202 and optimization circuitry 204 may then be configured to determine one or more feature descriptors, e.g., feature descriptor 252, for each feature point using the identified feature extraction technique.

Generally, each binary feature descriptor may be determined by comparing intensities of a number of pairs of pixels following a smoothing operation. The smoothing operation is configured to reduce noise sensitivity. Each pixel in a pair of pixels may correspond to a respective sample point included in a feature patch. The feature patch is related to the feature extraction technique and is configured to contain a corresponding feature point. Each sample point may contribute to more than one pair of pixels utilized to determine a descriptor bit. Each bit in the binary feature descriptor may then correspond to a difference in intensities between pairs of smoothed areas. Each smoothed area is associated with, and is configured to surround, a corresponding sample point.

The pairs of sample points may be selected based, at least in part, on the feature extraction technique. For example, for BRIEF and ORB, the sample points may be randomly positioned in the feature patch. In another example, for BRISK, the sample points may be equally spaced on concentric circles surrounding the feature point. In another example, for the FREAK technique, the sample points may be positioned on concentric circles with a number of sample points per circle the same for the concentric circles, thus, the density of sample points per circle decreases with distance from center.

In the following, operations of feature extraction circuitry 202 and optimization circuitry 204 are described with respect to the FREAK feature extraction technique. It should be noted that similar feature extraction operations (and optimizations) may be performed for other feature extraction techniques (e.g., BRIEF, BRISK, ORB), within the scope of the present disclosure.

Initially, optimization circuitry 204 may be configured to determine whether a spatial locality exists between a plurality of feature points. Each feature point has a corresponding feature patch that circumscribes and contains an area about the respective feature point. For example, the feature patch may be a circle. In another example, the feature patch may be a rectangle, e.g., a square. In another example, the feature patch may have a plurality of sides, e.g., a hexagon. Spatial locality may exist between two feature points whose corresponding feature patches overlap. As used herein, "individual feature patch" corresponds to a feature patch that does not overlap another feature patch, "composite feature patch" corresponds to a combination of overlapping feature patches and "feature patch", without a qualifier corresponds to individual and/or composite feature patch. Optimization circuitry 204 may be configured to determine a boundary of a composite feature patch. Spatial locality between a plurality of feature points may then be exploited by optimization circuitry 204 to accelerate operations of feature extraction circuitry 202 for each composite feature patch, as described herein.

Integral image circuitry 220 is configured to determine an integral image for each feature patch. The integral image is configured to facilitate intensity determinations for each sample point. An integral image may correspond to a two-dimensional lookup table (LUT) in the form of a matrix with the same size as the feature patch. The integral image facilitates determination of an intensity associated with a rectangular area in the feature patch, at any position or scale, using four look ups and addition and/or subtraction operations. An integral image is an intermediate representation of a portion of an input image, e.g., a feature patch. Each location, e.g., pixel location, in an integral image contains a sum of pixel intensities for pixels above and to the left, inclusive, of the pixel location. A sum of pixel intensities of a rectangular array of pixels may then be determined using the integral image pixel intensities of the four corner pixels of the rectangular array. Generally, the sum of pixel intensities of the rectangular array may then be determined with two additions and one subtraction of the four corner pixels.

In an embodiment, optimization circuitry 204 may be configured to optimize determination of an integral image of a feature patch, e.g., integral image 238, by integral image circuitry 220. The optimizations include determining each sum of pixel intensities for the feature patch utilizing a line buffer, a register and two (rather than three) addition operations, e.g., using two adder circuitries. For example, the optimization circuitry 204 may configure the integral image circuitry 220 to determine each integral image value utilizing the register, the line buffer and two addition operations. A width of the line buffer may correspond to a width of the feature patch. The optimizations are configured to facilitate determining the integral image of the feature patch "on-the-fly", e.g., as input image data is being retrieved from system memory 212.

Figure 3:
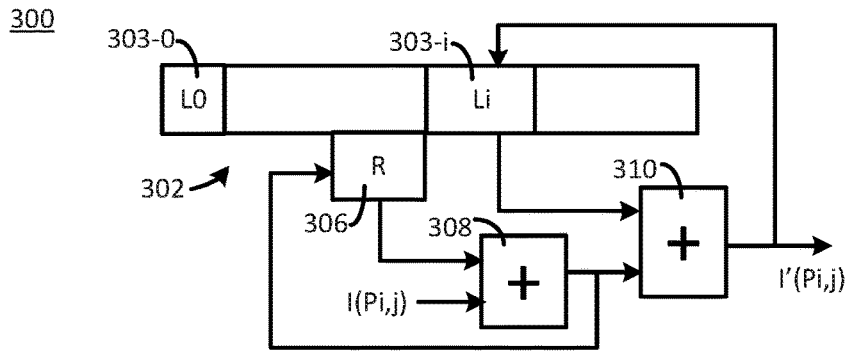
FIG. 3 illustrates a functional block diagram of an example integral image circuitry, consistent with several embodiments of the present disclosure.

FIG. 3 illustrates a functional block diagram of an example integral image circuitry 300, consistent with several embodiments of the present disclosure. Example integral image circuitry 300 is one example of integral image circuitry 220 of FIG. 2. Example integral image circuitry 300 includes a line buffer 302, a register 306 and two adders 308, 310. The line buffer 302 includes a plurality of elements, e.g., elements 303-0 and 303-$i$, configured to store a respective value, e.g., L0 and L$i$, respectively.

Integral image circuitry 300 may be configured to retrieve an input image feature patch, e.g., input image feature patch 236, e.g., from system memory 212 or from local memory 236. Each input image feature patch may include an array of pixel intensity values. For example, the array may have M columns and N rows with i corresponding to a column index and j corresponding to a row index. I(P$i,j$) may then correspond to pixel intensity value for pixel Pi,j and I'(Pi,j) may then correspond to pixel integral image value for pixel Pi,j. The line buffer 302 may then have size M and a buffer index may correspond to the column index, i. Thus, i=0, 1, . . . , M−1.

Initially, the line buffer 302 may be loaded with a first row (i=0, 1, . . . , M−1; j=0) of feature patch pixel intensity values (I(Pi,0); i=0, 1, . . . , M−1) and the register 306 may be initialized to zero. Then, for each element of the line buffer 302 beginning with element 303-0, a corresponding pixel intensity value, I(Pi,0), may be added to the contents, R, of the register 306 by, e.g., adder circuitry 308, to yield R=R+I(Pi,0). The resulting contents, R, of the register 306 may then be added to the value Li of element 303-i of the line buffer 302 by, e.g., adder circuitry 310, to yield Li=I'(Pi,0). In some embodiments, F(Pi,0) may then be stored to the corresponding integral image, e.g., integral image 238 that may be included in data 230 and/or data 231 of FIG. 2. For each subsequent iteration, the line buffer 302 may initially contain the results of a corresponding prior iteration and the register 306 contents, R, may be initialized to zero. The operations in pseudocode (after loading line buffer 302 with the first row of feature patch intensity values (I(Pi,0); i=0, . . . , M−1)) may correspond to:

```
for (j = 0; j < N; j = j +1){
    R = 0;
    for (i = 0; i < M; i = i +1){
        R = R + I(Pi,j)
        Li = R + Li
        store Li to I'(Pi,j)
    }
}
```

For each iteration of the outer for loop (for (j=0; j<N; j=j+1)), initially the line buffer 302 contains, the integral image values I'(Pi,j−1), i=0, . . . , M−1, for a prior row j−1, and the register 306 contains zero, i.e., R=0. During operation of the inner for loop, for column i and row j (i.e., for line buffer element 303-i), initially, the register 306 value $R = \sum_{m=0}^{i-1} I(P_{m,j})$ and line buffer element 303-i value Li is equal to I'(Pi,j−1). After each iteration of the inner for loop, the register 306 contains $\sum_{m=0}^{i} I(P_{m,j})$ and line buffer element 303-i contains I'(Pi,j).

Thus, determination of the integral image of each feature patch may be implemented using a line buffer, a register and two adders. Turning again to FIG. 2, input image data 236 for each feature patch may be retrieved from system memory 212 and/or local memory 262. The integral image 238 of the feature patch may be determined and the integral image 238 may be stored to system memory 212 and/or local memory 262. In embodiments that include image cache 260, selected integral image values may be stored (e.g., cached) to the image cache 260, as described herein. For example, optimization circuitry 204 may configure the integral image circuitry 220 to store a selected integral image value to the image cache 260.

SP intensity circuitry 222A is configured to determine an intensity for each sample point. The sample point intensity value corresponds to a smoothed intensity value for a region around the sample point ("sample point region"). A size of the sample point region may be determined, based, at least in part, on a sample point size included in configuration data, as described herein. The smoothed intensity value may be determined based, at least in part, on integral values for the sample point region. Each feature extraction technique may define the sample point region as a radius of a circle centered on the sample point and may be configured to determine a smoothed intensity for the corresponding circle. In the FREAK feature extraction technique, at least some of these sample point regions (e.g., for sample points positioned on a same radial line and on adjacent concentric circles) may overlap. The smoothing is configured to mitigate noise effects.

In an embodiment, optimization circuitry 204 may be configured to optimize determination of each sample point region intensity value. For example, the optimizations are configured to exploit characteristics of the image integral to accelerate determination of sample point intensity values. The optimizations include defining a rectangular, e.g., square, sample point region for each sample point and utilizing a box filter to smooth the square sample point region. A dimension (e.g., length, width) of the square sample point region is related to a sample point size that is defined by the feature extraction technique. For example, the length and width of a square sample point region may each correspond to a diameter of a circular sample point region, i.e., may be two times the sample point size.

SP intensity circuitry 222A may then be configured to smooth the intensity of each square sample point region by applying a box filter to the square sample point region. For example, the optimization circuitry 204 may configure the SP intensity circuitry 222A to smooth the intensity of the rectangular sample point region using a box filter. A box filter of a square sample point region corresponds to the integral value of the square sample point region divided by a number of pixels included in the sample point region. A size of the sample point region and, thus, the box filter area is related to sample point size, as described herein.

The integral value of the square sample point region may be determined based, at least in part, on the corresponding integral values of the four pixel locations at the corners of the square sample point region. For example, for a square sample point region with an integral value, I'(P1), of a first pixel location (P1) corresponding to a upper left corner, an integral value, I'(P2), of a second pixel location (P2) corresponding to a upper right corner, an integral value, I'(P3), of a third pixel location (P3) corresponding to a lower left corner and an integral value, I'(P4), of a fourth pixel location (P4) corresponding to a lower right corner, the integral value of the sample point region may be determined as I'(P4)+I'(P1)−(I'(P2)+I'(P3)). Upper, lower, left and right correspond to a two-dimensional array (e.g., N rows by M columns) of integral image data with pixel location 0,0 corresponding to an upper left corner and a pixel location M−1,N−1 corresponding to a lower right corner of the integral image.

Thus, implementing a box filter for a square sample point region may optimize, e.g., accelerate, smoothing a sample point intensity for each sample point. In other words, smoothing the sample point intensity includes two additions and one subtraction independent of the size (e.g., number of pixels) of the sample point region.

Each smoothed sample point intensity 240 may then be provided to, and/or retrieved by, orientation circuitry 224. Orientation circuitry 224 may then be configured to determine an orientation of the corresponding feature patch based, at least in part, on the smoothed sample point intensities. For example, for the FREAK feature extraction technique, the orientation may be determined as:

$$O = \frac{1}{M} \sum_{P_o \in G} (I(P_o^{r1}) - I(P_o^{r2})) \frac{P_o^{r1} - P_o^{r2}}{\|P_o^{r1} - P_o^{r2}\|}$$

where G is the set of sample point pairs to be used for determining orientation, M is the number of pairs in G, $P_o^{r_i}$ is the two-dimensional vector of the spatial coordinates of the center of the sample point region ("receptive field" in the FREAK feature extraction technique) and $I(P_o^{r_i})$ Is the smoothed intensity of the corresponding sample point region. Thus, the orientation, O, corresponds to a two-dimensional vector ($u_x$, $u_y$) determined based, at least in part, on M pairs of sample points. The number of selected sample point pairs and the particular selected sample point pairs involved in the orientation determination may be included in feature configuration data, as described herein.

In some embodiments, based, at least in part, on the determined orientation, O, of the feature patch, a respective location of each of one or more sample points that is to be utilized for feature descriptor determination may be adjusted. In other words, one or more sample points, different from the initial sample points, may be selected. Sample point adjustment operations may be performed, for example, by optimization circuitry 204, orientation circuitry 224 or SP intensity circuitry 222B.

Figure 4:
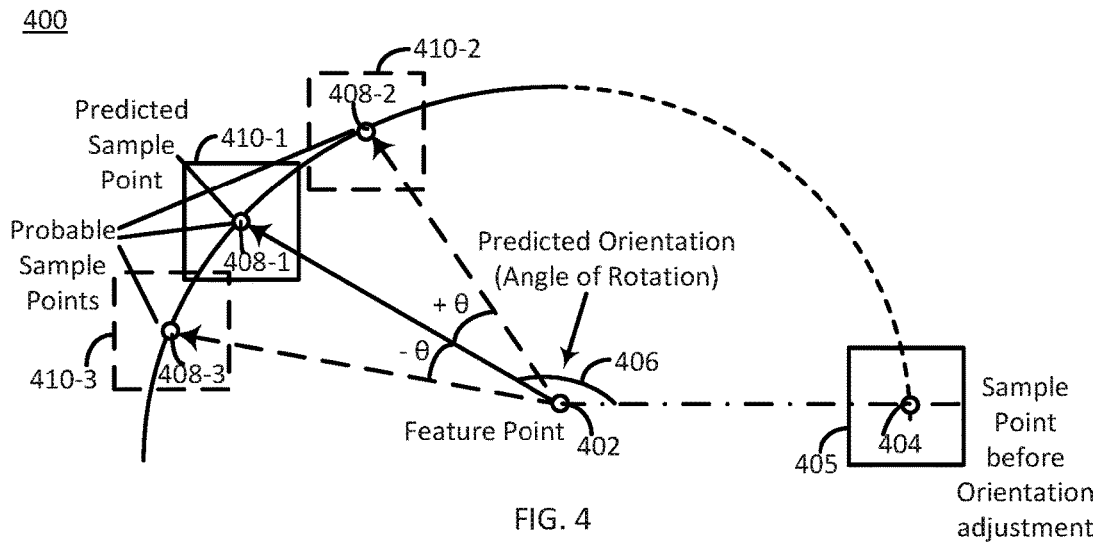
FIG. 4 illustrates one example sample point adjustment based on orientation consistent with one embodiment of the present disclosure.

FIG. 4 illustrates one example 400 sample point adjustment based on orientation consistent with one embodiment of the present disclosure. Example 400 includes a feature point 402 and a sample point 404 positioned relative to the feature point 402. Sample point 404 is positioned at a center of a sample point region 405. Example 400 further includes a plurality of probable sample points 408-1, 408-2, 408-3. Each probable sample point is positioned at a center of a respective sample point region 410-1, 410-2, 410-3.

Sample point 404 is positioned at a sample point location utilized prior to orientation adjustment. Probable sample point 408-1, positioned on an arc between probable sample points 408-2 and 408-3 corresponds to a predicted sample point. The predicted sample point 408-1 is positioned at an angle of rotation 406 that corresponds to a predicted orientation. The predicted orientation 406 corresponds to an angle between sample point 402 and the predicted sample point 408-1. The probable sample points 408-2 and 408-3 are each separated from the predicted sample point 408-1 by an angle, θ.

The angle θ may be defined as $\tan^{-1}(u_y/u_x)$. The angle θ may then be utilized to determine a location of an adjusted sample point based, at least in part, on the orientation. For example, $P_{i,j}$ and $P'_{k,l}$ may correspond to a location of a sample point before and after orientation adjustment, respectively. The indexes k and l (column and row indices) of the adjusted sample point may then be determined as:

$$k = x + (i-x)*\cosine(\theta) - (j-y)*\sine(\theta)$$

$$l = y + (i-x)*\sine(\theta) + (j-y)*\cosine(\theta).$$

In this example, point (x,y) refers to the pixel location of the feature point in the image. As an optimization, the angle θ may not be explicitly determined. Rather, sine(θ) and cosine(θ) may be determined based, at least in part, on the orientation vector (Ux, Uy) and utilizing a look-up table (LUT) with (Ux/Uy) as a LUT index, where Ux/Uy corresponds to a ratio of Ux to Uy. The size of the LUT may be limited while maintaining accuracy, by determining sine(θ) and cosine(θ) as:

```
if(|Ux| > |Uy|), then ratio = |Uy| / |Ux|
   else, ratio = |Ux| / |Uy| and
if (|Ux| > |Uy|), then
   sine(θ) = LUT_Sine(ratio) * sign_function(Ux)
```

```
   cosine(θ) = LUT_Cosine(ratio) * sign_function(Uy)
      else,
   sine(θ) = LUT_Cosine(ratio) * sign_function(Ux)
   cosine(theta) = LUT_Sine(ratio) * sign_function(Uy)
``` where the sign_function(a) is defined as:

$$\text{sign\_function}(a) = \begin{Bmatrix} 1 \text{ if } a \geq 0 \\ -1 \text{ if } a < 0 \end{Bmatrix}$$

The values in the LUT are predetermined for range of values from 0 to 1.

Transformation of a sample point to an orientation-adjusted sample point is based, at least in part, on a generic rotation matrix. The transformation may thus be applied to a feature extraction technique that has a rotation invariant feature descriptor.

If the sample points are adjusted, SP intensity circuitry 222B may be configured to receive the adjusted sample point locations and/or the orientation 242 from orientation circuitry 224. SP intensity circuitry 222B may then be configured to determine an intensity for each adjusted sample point. Determination of sample point intensity by SP intensity circuitry 222B is similar to determination of sample point intensity by SP intensity circuitry 222A, as described herein. In some embodiments, SP intensity circuitry 222B and SP intensity circuitry 222A may be a same SP intensity circuitry.

In some situations, determination of sample point intensity by SP intensity circuitry 222B may not be included in feature descriptor determination operations. For example, determination of sample point intensity by SP intensity circuitry 222B may not be performed for selected orientation values, e.g., orientation angle(s) 60°, 120°, 180°, 240°, 300° and/or 0°. Sample points may be grouped in concentric circles with different respective radii. A plurality of sample points with a same radius (i.e., a same distance from the feature point) may be placed at a constant angular distance, e.g., 60°. If a determined orientation matches the constant angle or can be expressed in terms of a multiple of this angle, then an adjusted sample point will coincide with an original, pre-adjusted sample point. Thus, in these situations, sample point intensity may not be determined by SP intensity circuitry 222B.

Thus, respective smoothed sample point intensities may be determined by SP intensity circuitry 222A and/or 222B. The smoothed sample point intensities 240 and/or 244 may then be provided to descriptor circuitry 226. Descriptor circuitry 226 is configured to determine a feature descriptor for each feature point based, at least in part, on the smoothed sample point intensities. Each element of the feature descriptor may correspond to a result of a comparison of respective smoothed sample point intensities of a pair of sample points. Each pair of sample points may include a first sample point and a second sample point. Each feature descriptor 252 may then be stored to system memory 212.

In some embodiments, optimization circuitry 204 may be configured to sort a set of sample point pairs prior to operation of descriptor circuitry 226. For example, optimization circuitry 204 may be configured to sort a plurality of pairs of sample point intensity values according to a location of a first or second sample point of each pair. Each sample point pair may contain a first sample point and a second sample point. Optimization circuitry 204 may be configured to cluster sample point pairs according to an associated location of each first or each second sample point in the sample point pairs. It may be appreciated that one sample point, e.g., a first sample point and/or a second sample point, may be utilized in determining a plurality of feature descriptor elements (e.g., descriptor bits). The sorted sample point pairs may then be stored to sorted descriptor pair 250 by, e.g., optimization circuitry 204. Sorting the sample point pairs according to the location of each first or second sample point is configured to reduce power consumption of feature extraction circuitry 202 and/or descriptor circuitry 226.

Figure 5:
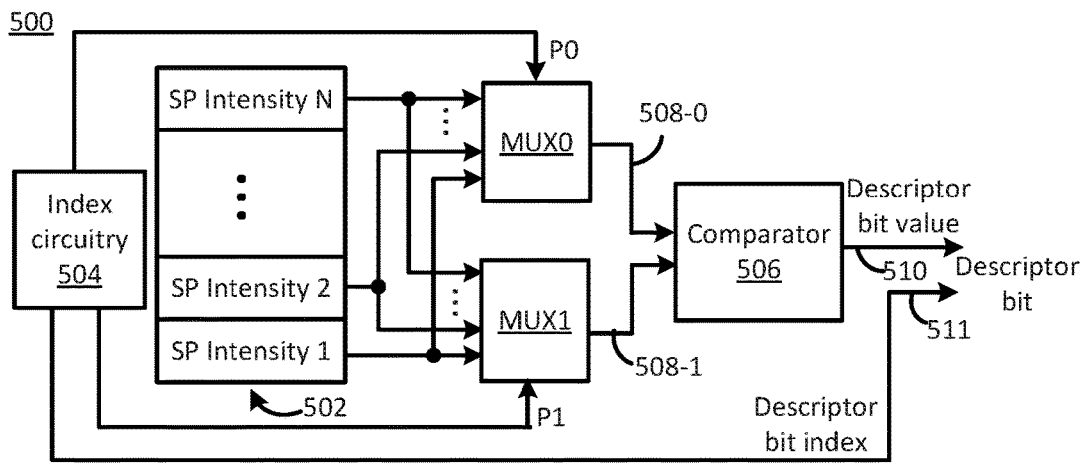
FIG. 5 illustrates a functional block diagram of an example descriptor circuitry, consistent with several embodiments of the present disclosure.

FIG. 5 illustrates a functional block diagram of an example descriptor circuitry 500, consistent with several embodiments of the present disclosure. Example descriptor circuitry 500 is one example of descriptor circuitry 226 of FIG. 2. Example descriptor circuitry 500 includes an array 502 of sample point intensities, SP intensity 1, SP intensity 2, . . . , SP intensity N.

Example descriptor circuitry 500 further includes a first multiplexer MUX 0, a second multiplexer MUX 1, an index circuitry 504 and a comparator 506. The first multiplexer MUX 0 has an output 508-0 and the second multiplexer MUX 1 has an output 508-1. Index circuitry 504 is configured to contain a plurality of pairs of indexes, P0, P1, that may be sorted and in an order. For example, the indexes may be sorted based, at least in part, on a first index, P0, or a second index, P1, as described herein. Each multiplexer MUX 0, MUX 1 is coupled to the array 502 of sample point intensities.

Index circuitry 504 is configured to provide the first index, P0, and the second index, P1, to the first multiplexer MUX 0 and the second multiplexer MUX 1, respectively. The first index, P0, corresponds to a first selector input to the first multiplexer MUX 0. The second index, P1, corresponds to a second selector input to the second multiplexer MUX 1. A first sample point location of a pair of sample point locations may thus correspond to the first selector input, P0, and a second sample point location of the pair of sample point locations may thus correspond to the second selector input, P1.

The outputs 508-0, 508-1 of the multiplexers MUX 0, MUX 1 are input to the comparator 506 and the output of the comparator 506 corresponds to a descriptor bit value 510. Index circuitry 504 is further configured to provide a descriptor bit index 511 as output of example descriptor circuitry 500. Thus, example descriptor circuitry 500 may be configured to provide a feature descriptor that includes a plurality of descriptor bits that include a descriptor bit value and associated descriptor bit index.

Clustering the first sample points (or second sample points) by sample point location is configured to reduce a number of toggles of the first multiplexer MUX 0. Power consumption of example descriptor circuitry 500, descriptor circuitry 226 and/or feature extraction circuitry 202 may then be reduced. Reduced power consumption may then correspond to an optimization provided by optimization circuitry 204.

Turning again to FIG. 2, in some embodiments, feature extraction circuitry 202 may be configured to determine the feature descriptor 252 utilizing an intermediate floating point precision. For example, integral image circuitry 220, SP intensity circuitry 222A, orientation circuitry 224 and/or SP intensity circuitry 222B may be configured to perform their respective operations utilizing the intermediate floating point precision. For example, optimization circuitry 204 may configure the feature extraction circuitry 202 to determine the feature descriptor 252 utilizing intermediate floating-point precision. As used herein, intermediate floating point precision corresponds to fixed point precision based, at least in part, on a corresponding Q value. For example, a floating-point number may be converted to a fixed point number using a Q value. It may be appreciated that fixed point, i.e., integer, operations are generally less computationally intensive, and thus relatively faster to execute, compared to floating point operations. Thus, feature extraction operations may be accelerated and/or power consumption and/or computational intensity may be reduced.

A digital representation of a floating point number generally includes a number of mantissa bits, a number of exponent bits and a sign bit. The Q value may be utilized to convert a floating point number to a fixed point number, thus facilitating arithmetic operations. For example, the arithmetic operations may performed using integers. For example, for a floating point number of value float_a, the corresponding fixed point number, int_a, may be determined as:

$$\text{int}\_a = (\text{int})((\text{float}\_a * (\text{float})(1 << Q\_\text{value})) + 0.5)$$

where Q_value corresponds to a number of fractional bits and << corresponds to left shifting the value (e.g., 1) to the left of the shift symbol a number of bits equal to the Q_value. Adding 0.5 to the product of float_a and (float) (1<<Q_value) is configured to result in a rounding rather than a truncation when the floating point product is cast to an integer value. Multiplying the left shifted 1 (that has been left shifted by the Q_value) is configured to scale float_a by $2^{Q\_value}$, thus effectively converting the mantissa (e.g., a number between +1 and −1) to a corresponding whole number.

For example, optimization circuitry 204 may be configured to convert a floating point number to a fixed point number. Feature data 234 may include a feature point location and a corresponding scale. The feature point location and corresponding scale may be provided in floating point format by, e.g., feature detection circuitry 132. Similarly, configuration data 154 (e.g., sample point location, radius, values for sine and cosine lookup tables) may be provided by a user in floating point format. Feature extraction circuitry 202 is configured to determine, utilizing fixed-point operations, e.g., scaling of sample point based on feature point scale, locations of each of the four corners of the sample point region around each sample point, sine(θ) and cosine(θ) and/or determination of orientation adjusted sample points followed by determination of the four corners of the sample point region around each orientation-adjusted sample point.

A selected Q value may be pre-defined (e.g., through empirical calculation and/or experiments) for each input and/or output in each operation, separately, e.g., independently.

For example, a fixed-point representation of variable may be defined as (v, q) where v is an integer value and q is a pre-defined Q value. The fixed-point representation is equivalent to floating point representation of $v \times 2^{-q}$. A fixed point addition/subtraction operation may then be performed as:

$$(v,q) = ((v1 >> (q1-q)) \pm (v2 >> (q2-q)), q)$$

where (v, q) represents an output operand, (v1, q1) represents a first input operand and (v2, q2) represents a second input operand. Similarly, a multiplication operation may be performed as:

$$(v,q) = ((v1 * v2) >> (q1+q2-q), q)$$

and a divide operation may be performed as:

$(v,q) = (((v1 << (q+q2-q1))/v2),q).$

A fixed point result, int_b, of the fixed point arithmetic operations may be converted back to a corresponding floating point value, float_b, following the fixed point arithmetic operations as:

$float\_b = (float)int\_b/(float)(1 << Q\_value).$

In some embodiments, input configuration data 163 and/or feature configuration data 232 may include a Q value, a number of mantissa bits and/or an accuracy. The Q value, number of mantissa bits and accuracy may be associated with a selected operation and/or group of operations. For example, the configuration data may include a Q value, number of mantissa bits and accuracy associated with each operation of feature extraction circuitry 202. In another example, the configuration data may include a Q value and a number of mantissa bits associated with a group of operations configured to achieve an accuracy associated with the feature descriptor. Thus, the accuracy may be associated with the operations of feature extraction circuitry 202, as described herein.

Thus, intermediate floating point precision utilizing a Q value to convert a floating point number to a fixed point number, may be utilized to accelerate at least some arithmetic operations while maintaining a target accuracy. In other words, conversion from a floating point number to a fixed point number (with pre-defined Q value) supports replacing floating point operations with integer operations with a corresponding bit-precision. Thus, operations of feature extraction circuitry 202 may be accelerated, power-consumption may be reduced and/or, in some embodiments, a size (e.g., silicon area) of feature extraction circuitry 202 may be reduced. Utilizing intermediate floating point precision may thus correspond to an optimization of feature extraction circuitry, e.g., feature extraction circuitry 202, as described herein.

In some embodiments, an image cache, e.g., image cache 140 of FIG. 1 and/or image cache 260 of FIG. 2, may be included in image feature system 101 and/or image processing subsystem 200, as described herein. Image cache 140, 260 is configured to provide local temporary storage for feature extraction circuitry 134 and/or 202. Utilization of image cache 140, 260 is configured to reduce a number of system memory 108, 212 accesses, and corresponding memory bandwidth utilization by feature extraction circuitry during feature extraction operations, as described herein.

Optimization circuitry 204 and/or elements of feature extraction circuitry 202 may be configured to selectively store elements of an integral image 238 to image cache 260. As used herein, "smart caching" corresponds to selectively storing elements of an integral image to image cache 260. During operation of feature extraction circuitry 202, if there is an image cache 260 miss, the target integral image pixel value may be retrieved from system memory 212. The selectively stored integral image elements may include a set of integral image values associated with corner pixels of a rectangular sample point region. In some embodiments, a respective set of integral image values may be stored for each rectangular sample point region included in the feature patch. In some embodiments, a respective set of integral image values may be stored for sample point regions associated with sample points that are included in orientation determination operations.

In some embodiments, a respective set of integral image values may be stored for selected sample points. In one example, the sample points may be selected based, at least in part, on a respective location of each sample point. Sets of integral image values may be stored for sample points that are included in the feature patch. Integral image values for pixels not included in the feature patch may not be stored.

In another example, the sample points may be selected based, at least in part, on a prediction. For example, optimization circuitry 204 may be configured to predict an adjusted sample point location. The prediction may be based, at least in part, on an orientation (e.g., an angle of rotation) of an adjacent feature point and/or on a prediction technique.

In one example, the orientation for a feature point may be predicted based, at least in part, on spatial locality. For example, whether a previously determined feature point exists in a vicinity of current feature point may be determined. If such a previously determined feature point exists, the current feature point may inherit the orientation of the previously determined feature point as a predicted orientation. In another example, if a plurality of previously determined feature points exists in the vicinity of the current feature point, an average of the respective orientations of the previously determined feature points may be utilized as predictor of the orientation of the current feature point.

In another example, a respective spatial derivative of an image (pixel intensity) may be determined at a feature point in both a horizontal (column) and a vertical (row) direction. An estimate for orientation O (Ux, Uy) may then be predicted as Ux=Image derivative in the horizontal direction, Uy=Image derivative in the vertical direction.

Thus, selectively storing elements of an integral image to image cache 260 may facilitate, optimizing operation of feature extraction circuitry 202. For example, operation of feature extraction circuitry 202 may be accelerated. In another example, a number of system memory 212 accesses may be reduced.

Figure 6:
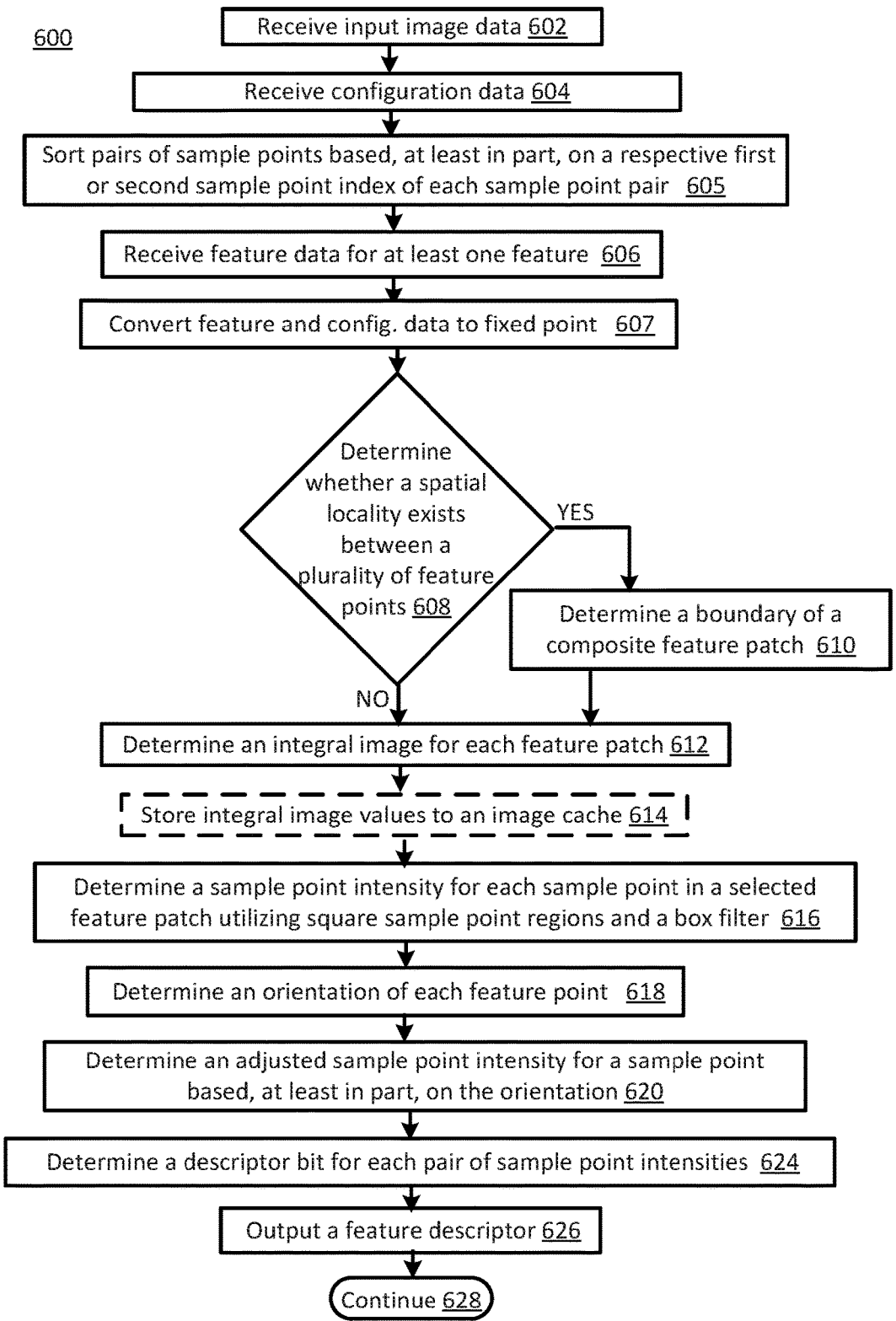
FIG. 6 is a flowchart of feature extraction operations, according to various embodiments of the present disclosure.

FIG. 6 is a flowchart of feature extraction operations, according to various embodiments of the present disclosure. In particular, the flowchart 600 illustrates determining a feature descriptor. The operations may be performed, for example, by feature extraction circuitry 134 and/or optimization circuitry 136 of FIG. 1 and/or elements of feature extraction circuitry 202 and/or optimization circuitry 204 of FIG. 2.

Operations of this embodiment may begin with receiving input image data at operation 602. Operation 604 may include receiving configuration data. Pairs of sample points may be sorted based, at least in part, on a respective first or second sample point index of each sample point pair at operation 605. Operation 606 may include receiving feature data for at least one feature. Feature data for each feature may include a feature point location identifier and a corresponding scale. Operation 607 includes converting feature data and configuration data to fixed point. Operation 608 may include determining whether a spatial locality exists between a plurality of feature points. If spatial locality exists between a plurality of feature points, a boundary of a composite feature patch may be determined at operation 610. Program flow may then proceed to operation 612. If spatial locality does not exist between a plurality of feature points, then program flow may then proceed to operation 612.

Operation 612 may include determining an integral image for each feature patch. In some embodiments, integral image values may be stored to an image cache in operation 614. A sample point intensity for each sample point in a selected feature patch may be determined utilizing square sample point regions and a box filter at operation 616. An orientation of each feature point may be determined at operation 618. A sample point intensity for an adjusted sample point may be determined at operation 620. The sample point may be adjusted based, at least in part, on the orientation. In an embodiment, an adjusted sample point location may be predicted, as described herein. Operation 624 may include determining a descriptor bit for each pair of sample point intensities. A feature descriptor may be output at operation 626. Program flow may continue at operation 628.

Thus, a feature descriptor may be determined and one or more operations of feature extraction circuitry may be optimized by optimization circuitry.

Figure 7:
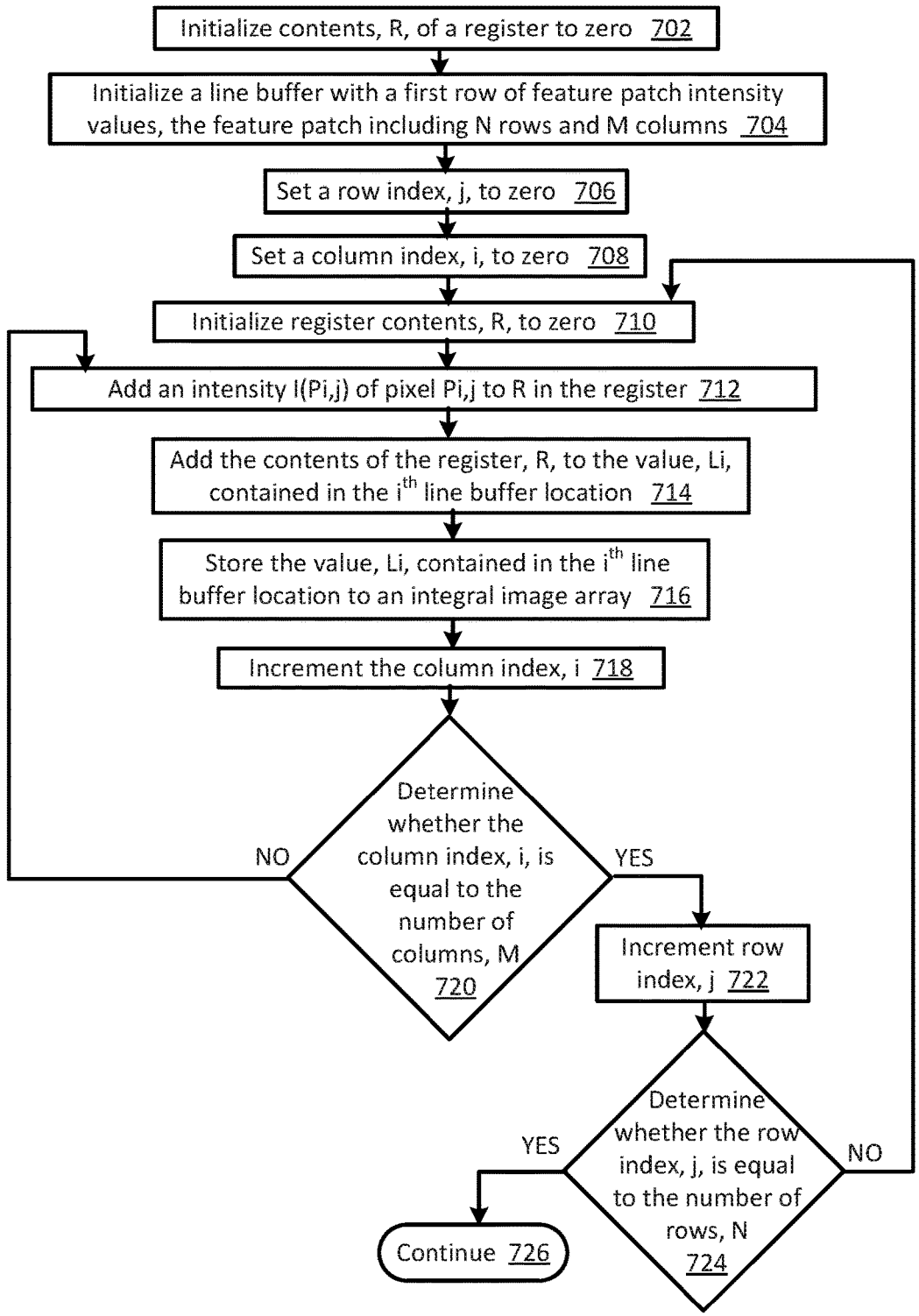
FIG. 7 is a flowchart of image integral value determination operations according to various embodiments of the present disclosure.

FIG. 7 is a flowchart of image integral value determination operations, according to various embodiments of the present disclosure. In particular, the flowchart 700 illustrates determining an image integral value utilizing a register, a line buffer and two addition operations. The operations may be performed, for example, by feature extraction circuitry 134 and/or optimization circuitry 136 of FIG. 1, integral image circuitry 120 and/or optimization circuitry 204 of FIG. 2 and/or example integral image circuitry of FIG. 3.

Operations of this embodiment may begin with initializing contents, R, of a register to zero at operation 702. A line buffer may be initialized at operation 704. For example, the line buffer may be loaded with a first row of feature patch intensity values. The feature patch may include N rows and M columns. A row index, j, may be set to zero at operation 706. A column index, i, may be set to zero at operation 708. The register contents, R, may be initialized to zero at operation 710. An intensity I(Pi,j) of pixel Pi,j may be added to R in the register at operation 712. The contents of the register, R, may be added to the value, Li, contained in the $i^{th}$ line buffer location at operation 714. The value, Li, contained in the $i^{th}$ line buffer location may be stored to an integral image array at operation 716. The column index, i, may be incremented at operation 718. Whether the column index, i, is equal to the number of columns, M, may be determined at operation 720. If the column index, i, is not equal to the number of columns, M, then program flow may proceed to operation 712. If the column index, i, is equal to the number of columns, M, then the row index, j, may be incremented at operation 722. Whether the row index, j, is equal to the number of rows, N, may be determined at operation 724. If the row index, j, is not equal to the number of rows, N, program flow may proceed to operation 710. If the row index, j, is equal to the number of rows, N, program flow may continue at operation 726.

Thus, an image integral value may be determined utilizing a register, a line buffer and two addition operations.

While the flowcharts of FIGS. 6 and 7 illustrate operations according various embodiments, it is to be understood that not all of the operations depicted in FIGS. 6 and 7 are necessary for other embodiments. In addition, it is fully contemplated herein that in other embodiments of the present disclosure, the operations depicted in FIGS. 6 and/or 7 and/or other operations described herein may be combined in a manner not specifically shown in any of the drawings, and such embodiments may include less or more operations than are illustrated in FIGS. 6 and 7. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

The figures below detail exemplary architectures and systems to implement embodiments of the above. In some embodiments, one or more hardware components and/or instructions described above are emulated as detailed below, or implemented as software modules.

Exemplary Register Architecture

Figure 8:
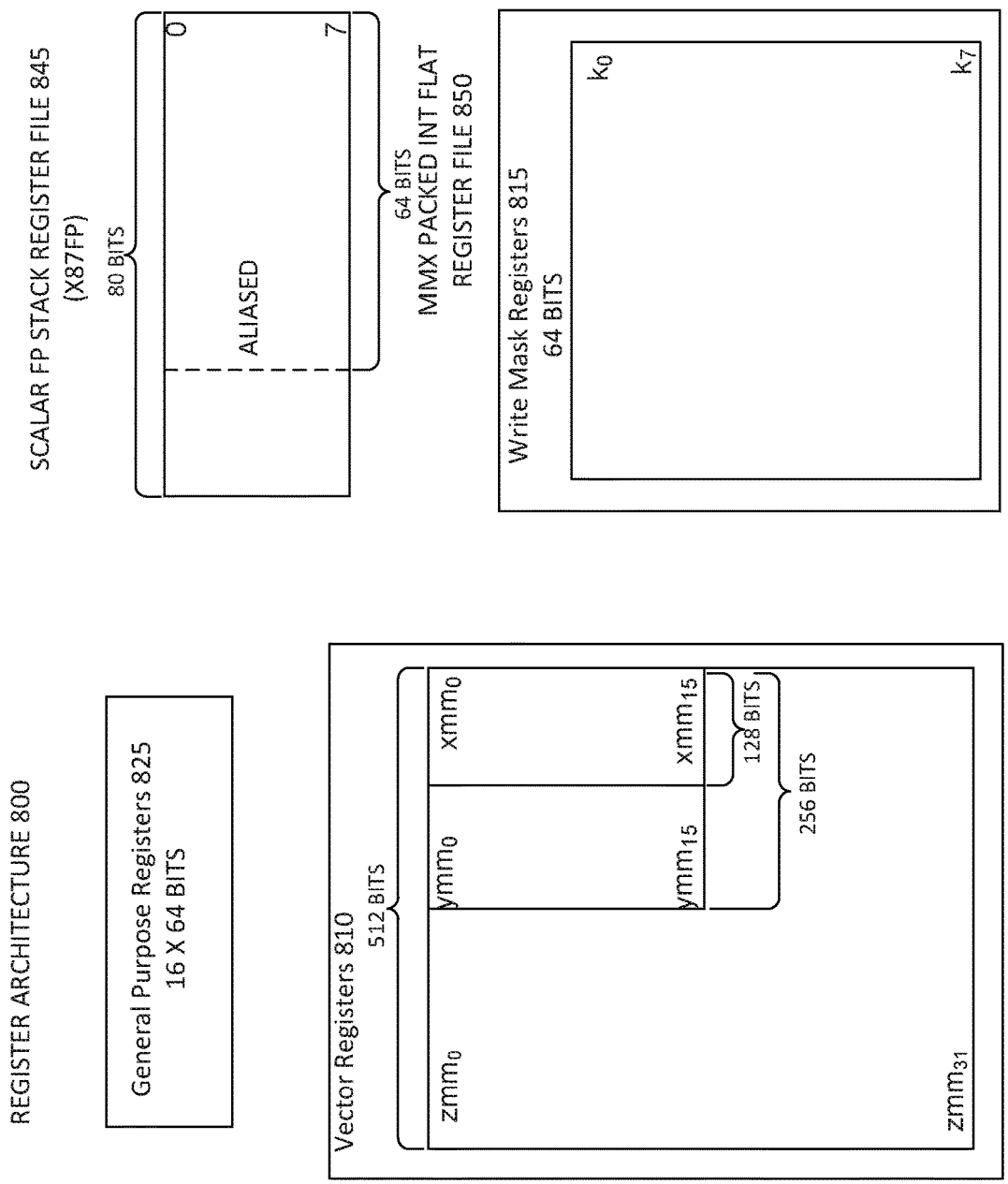
FIG. 8 is a block diagram of a register architecture according to one embodiment of the invention.

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. In one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 9A:
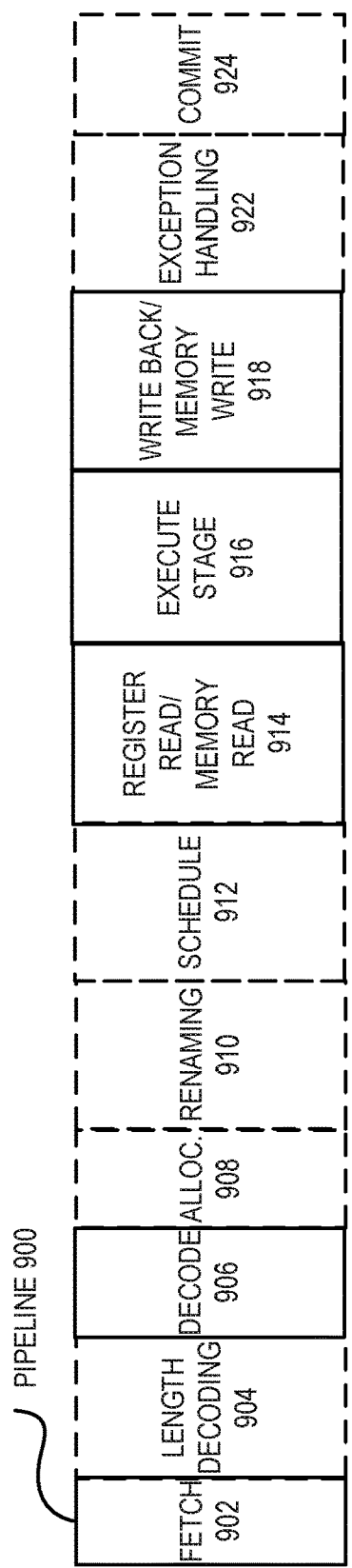
FIG. 9A is a block diagram illustrating both an exemplary in-order pipeline and an exemplary register renaming, out-of-order issue/execution pipeline according to embodiments of the invention.
Figure 9B:
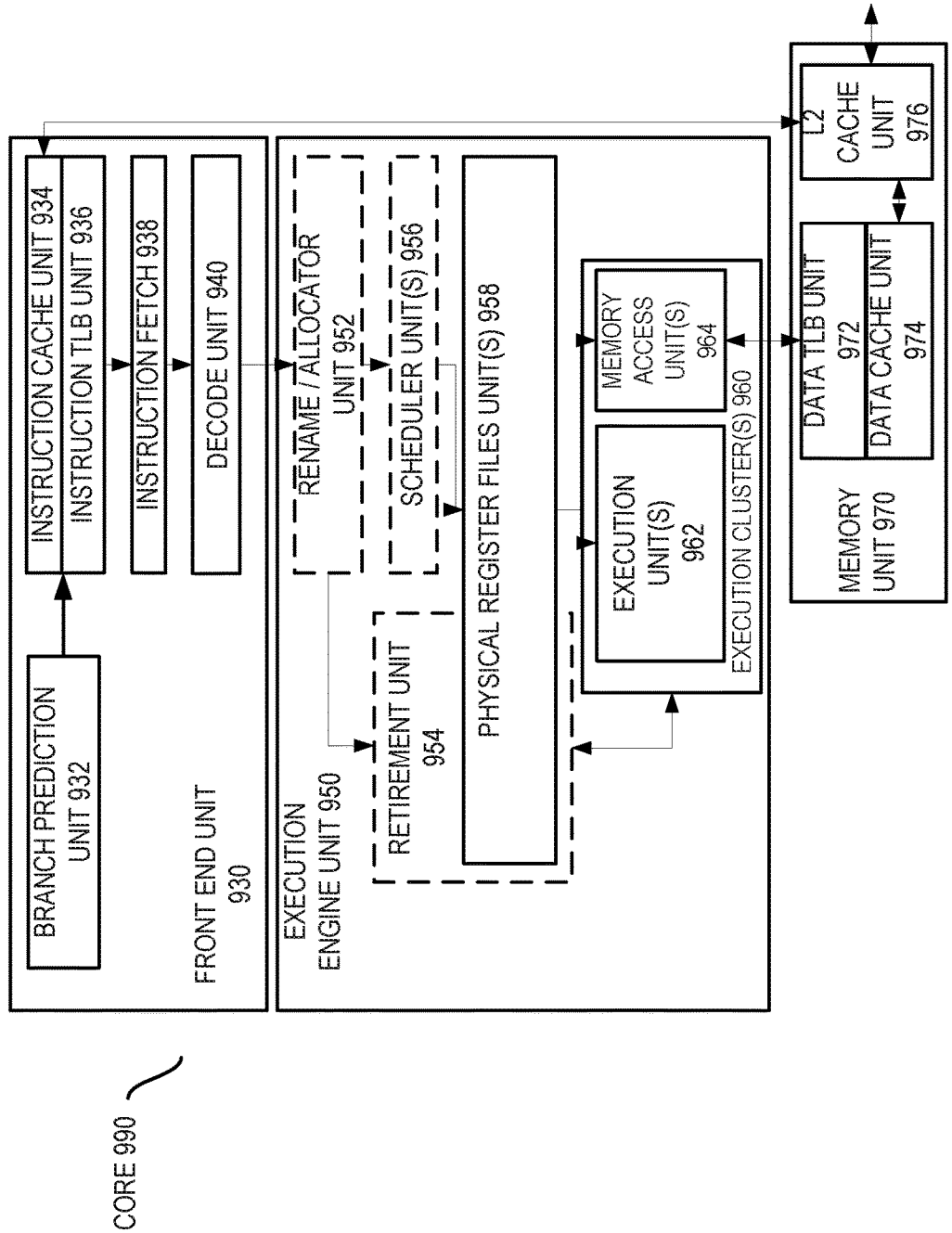
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
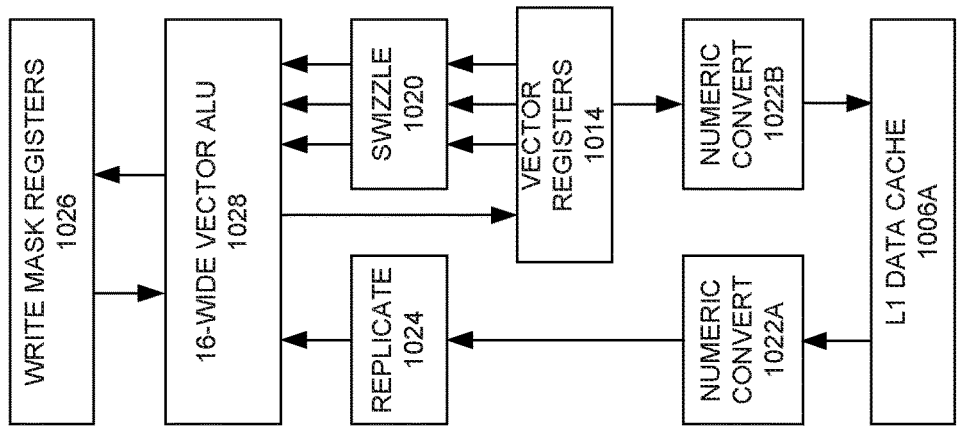
FIGS. 10A-B illustrate a block diagram of a more specific exemplary in-order core architecture, which core would be one of several logic blocks (including other cores of the same type and/or different types) in a chip.
Figure 10A:
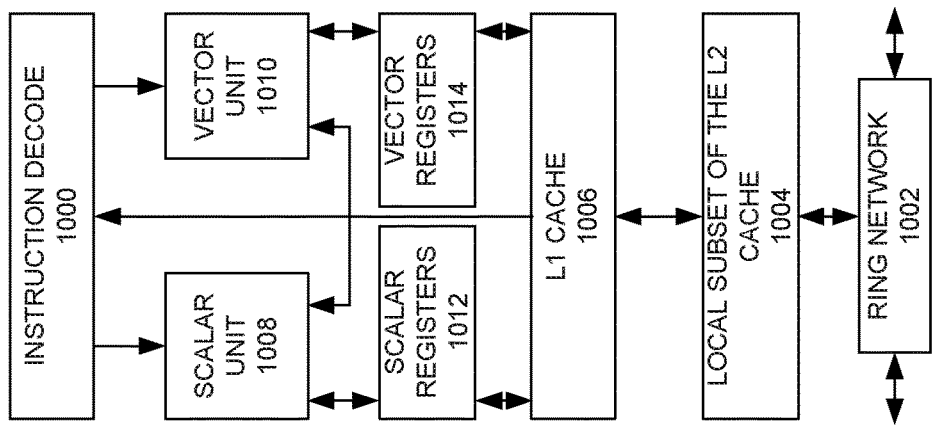

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
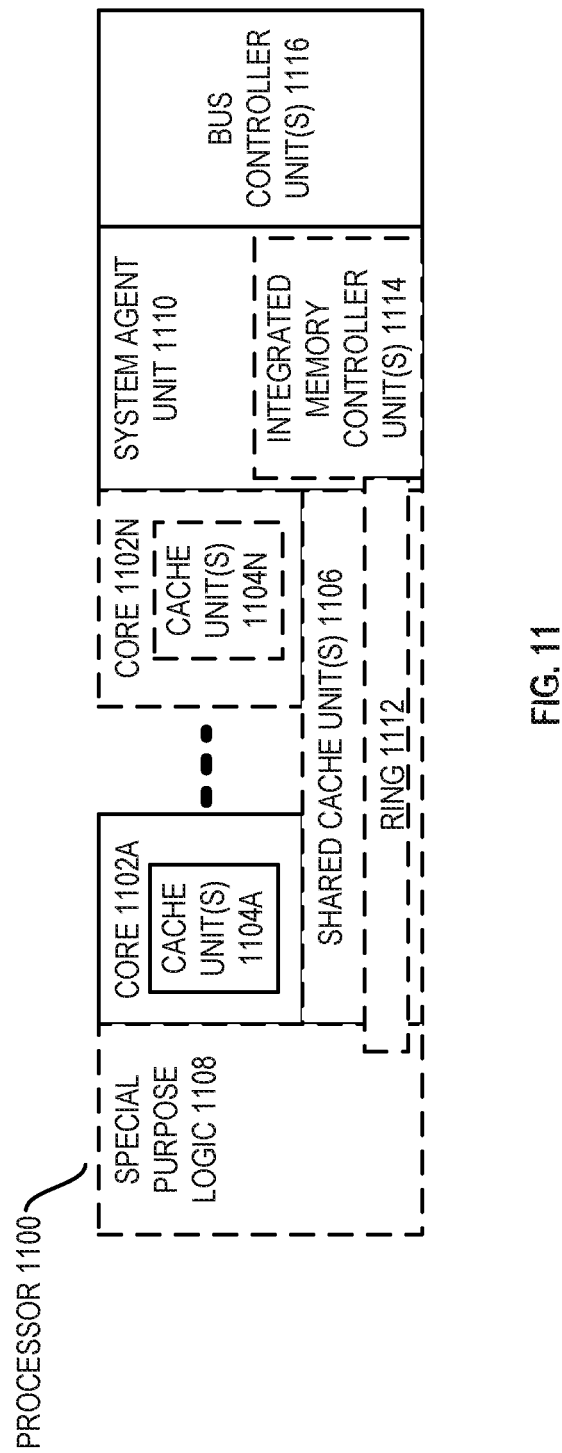
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
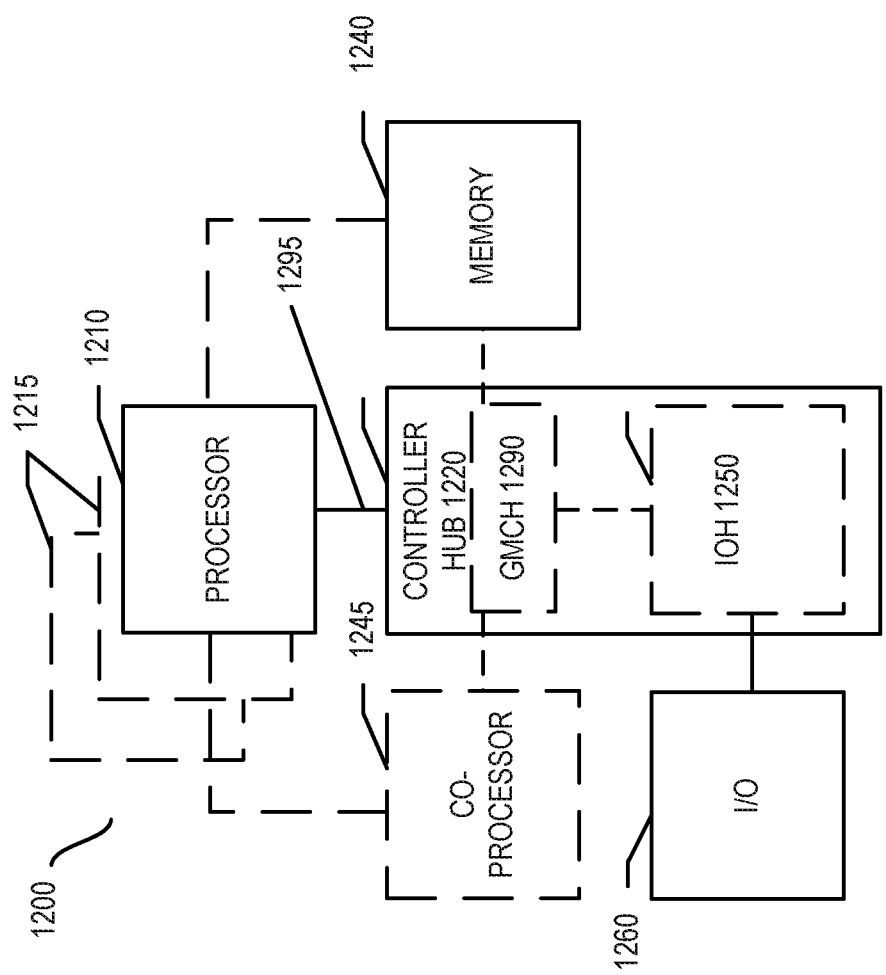
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
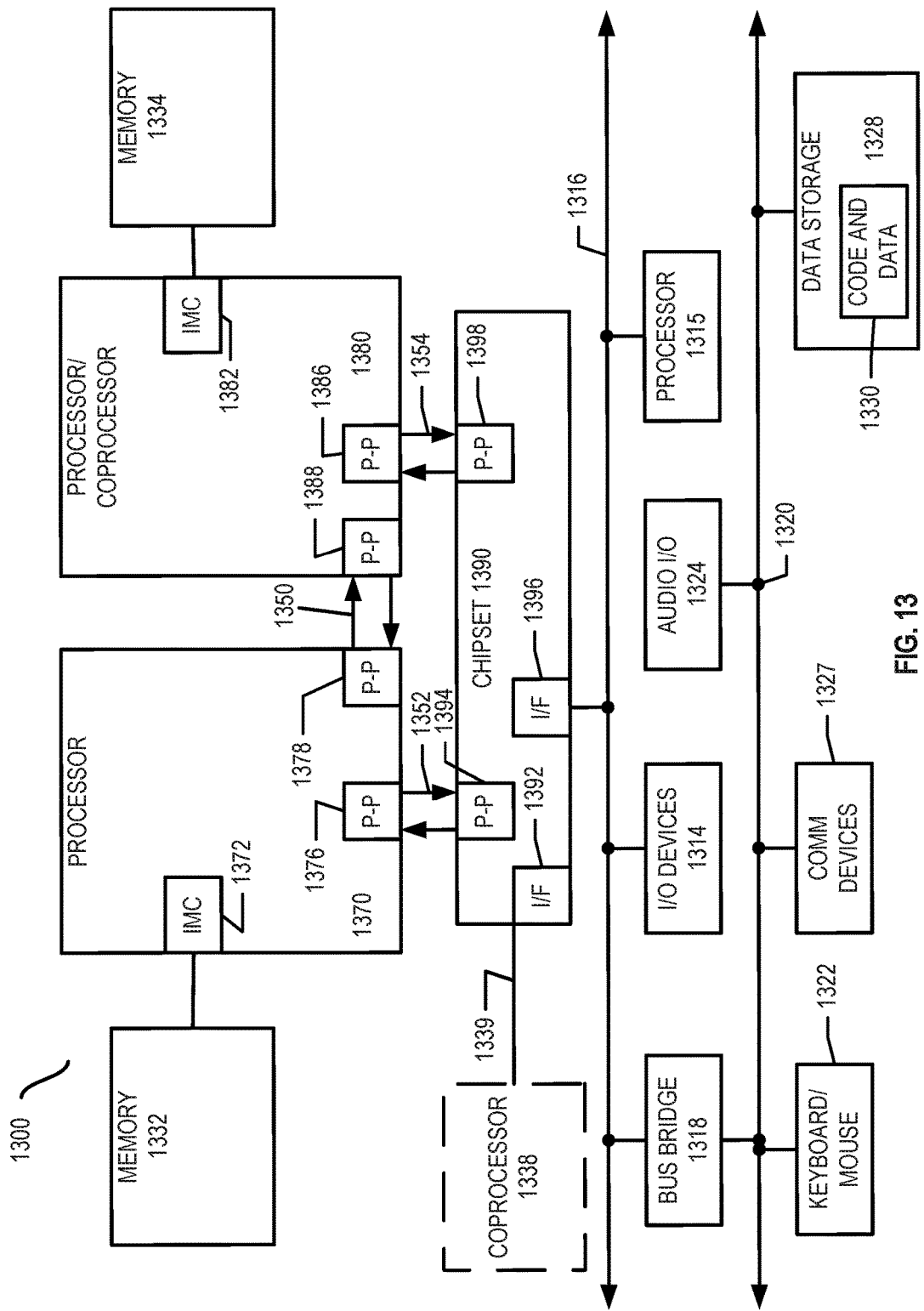

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
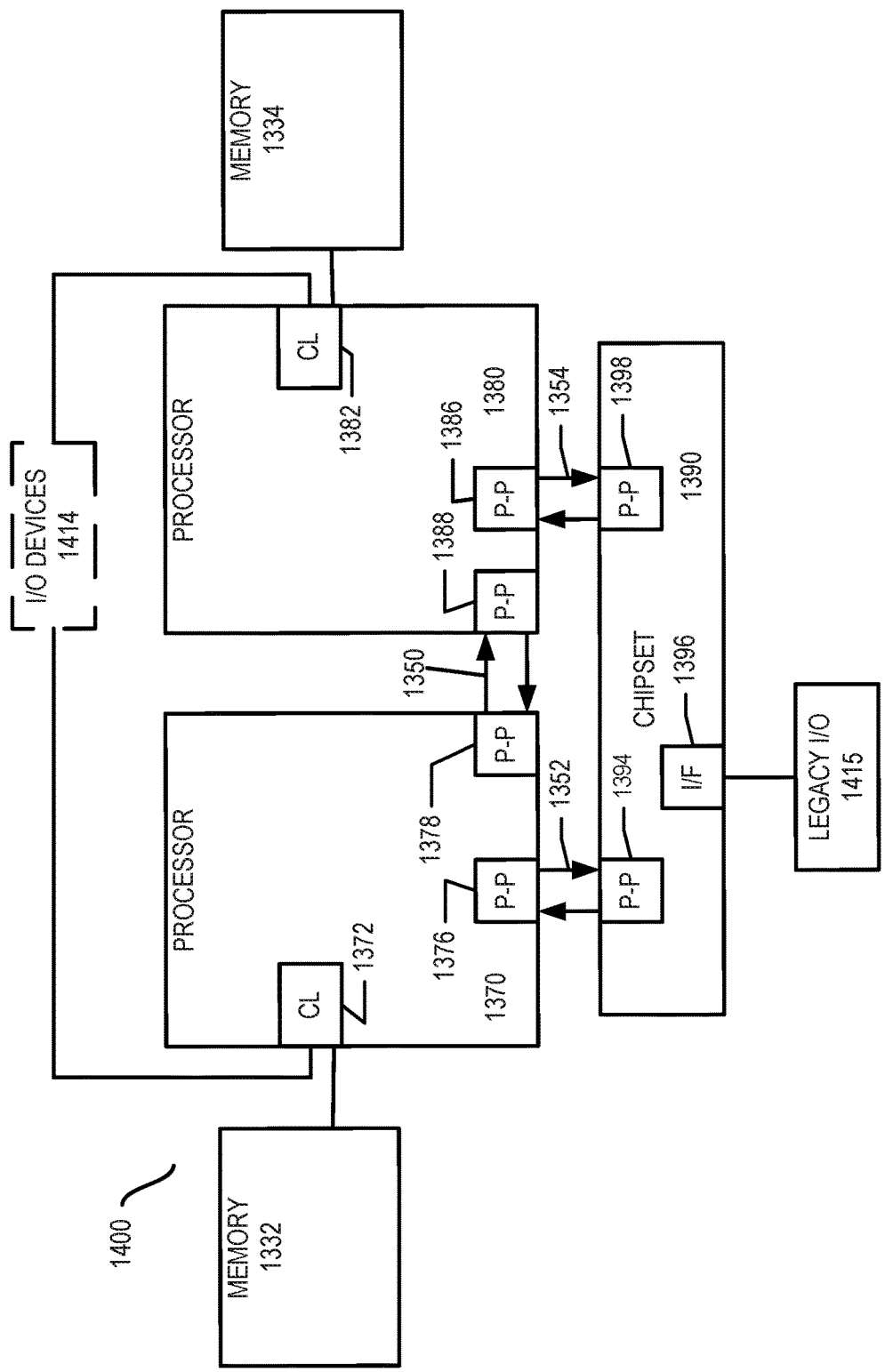

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
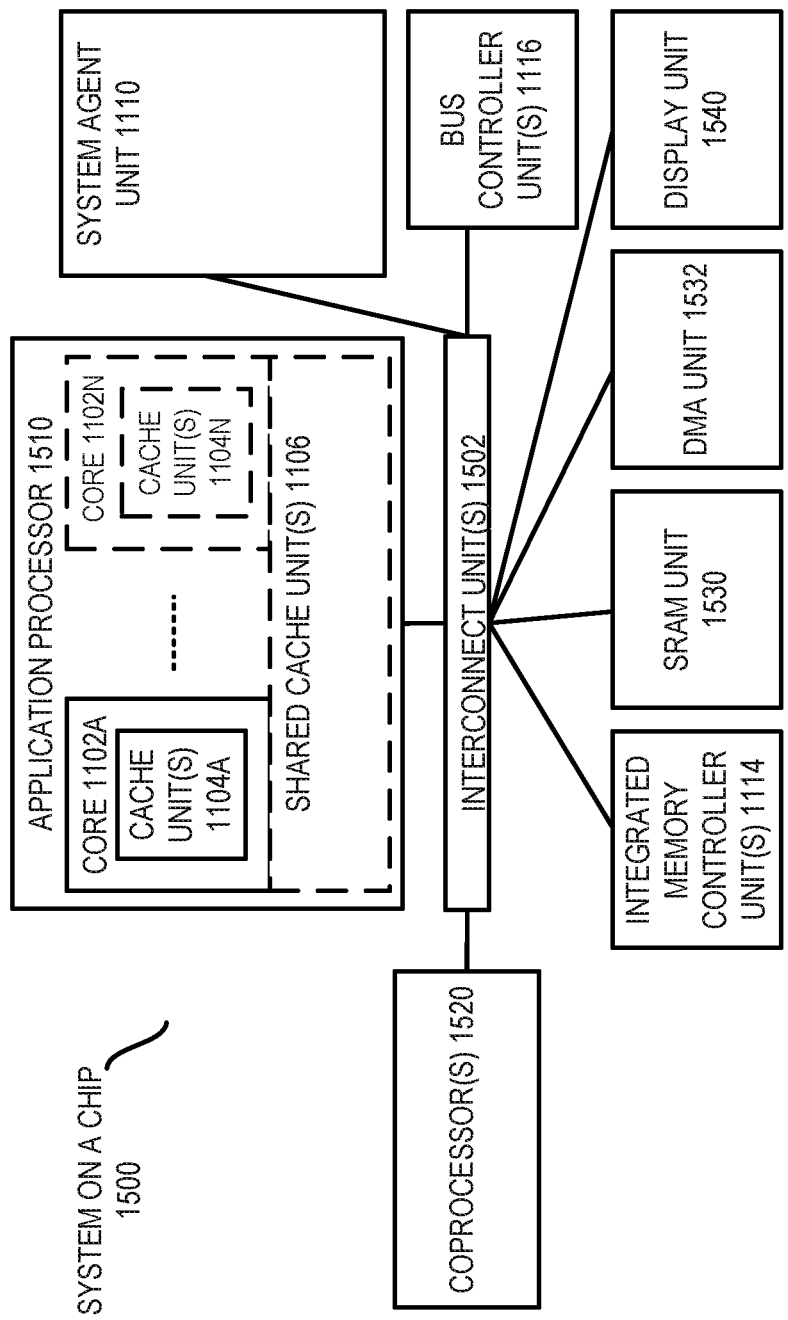

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
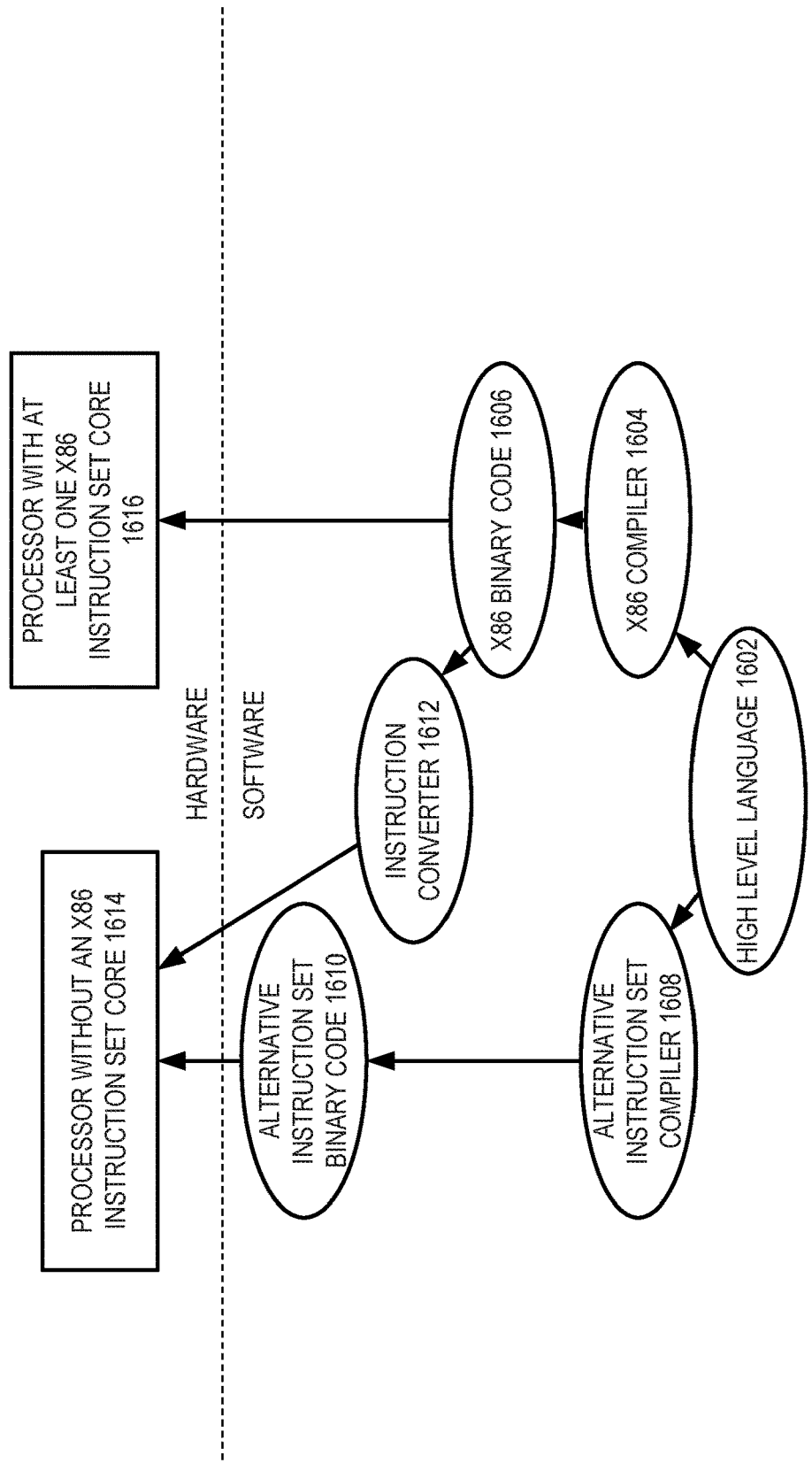
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor 102 executing code and/or instructions sets (e.g., software, firmware, etc.) corresponding to the functionality described herein, thus transforming a general-purpose processor into a specific-purpose processing environment to perform one or more of the operations described herein.

The foregoing provides example system architectures and methodologies, however, modifications to the present disclosure are possible. In some embodiments, the processor may include one or more processor cores and may be configured to execute system software. System software may include, for example, an operating system. The operating system (OS) may be configured to manage system resources and control tasks that are run on, e.g., image feature system 101. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units.

System memory 108, 212 and/or local memory 112, 262 include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory and/or local memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to optimized image feature extraction circuitry, as discussed below.

Example 1

According to this example there is provided an image processing circuitry. The image processing circuitry includes a feature extraction circuitry and an optimization circuitry. The feature extraction circuitry is to determine a feature descriptor based, at least in part, on a feature point location and a corresponding scale. The optimization circuitry is to optimize an operation of the feature extraction circuitry. Each optimization is to at least one of accelerate the operation of the feature extraction circuitry, reduce a power consumption of the feature extraction circuitry and/or reduce a system memory bandwidth used by the feature extraction circuitry.

Example 2

This example includes the elements of example 1, wherein the feature extraction circuitry includes an integral circuitry to determine an integral image of a feature patch associated with the feature point location, the optimization circuitry to configure the integral circuitry to determine each integral image value utilizing a register, a line buffer and two addition operations.

Example 3

This example includes the elements of example 1, wherein the optimization circuitry is to determine whether a spatial locality exists between a plurality of feature points.

Example 4

This example includes the elements of example 1, wherein the feature extraction circuitry includes a sample point (SP) intensity circuitry to determine a pixel intensity of a square sample point region associated with a sample point, the optimization circuitry to configure the SP intensity circuitry to smooth the intensity of the square sample point region using a box filter.

Example 5

This example includes the elements of example 4, wherein the optimization circuitry is to adjust a location of the sample point based, at least in part, on an orientation of a feature patch associated with the feature point location, utilizing an orientation vector.

Example 6

This example includes the elements according to any one of examples 1 through 4, wherein the optimization circuitry is to configure the feature extraction circuitry to determine the feature descriptor utilizing intermediate floating-point precision.

Example 7

This example includes the elements according to any one of examples 1 through 4, wherein the optimization circuitry is to sort a plurality of pairs of sample points according to an index of a sample point of each pair.

Example 8

This example includes the elements of example 4, wherein the optimization circuitry is to predict an adjusted sample point location.

Example 9

This example includes the elements of example 2, wherein the optimization circuitry is to configure the integral circuitry to store a selected integral image value to an image cache.

Example 10

This example includes the elements according to any one of examples 1 through 4, wherein the feature extraction circuitry at least one of complies and/or is compatible with a feature extraction technique selected from the group including FREAK (Fast Retina Keypoint), BRISK (Binary Robust Invariant Scalable Keypoints), BRIEF (Binary Robust Independent Elementary Features) and ORB (Oriented Fast and Rotated BRIEF).

Example 11

This example includes the elements according to any one of examples 1 through 4, wherein the optimization circuitry is to receive feature configuration data, the feature configuration data selected from the group including a sample point size, a location of each sample point relative to a corresponding feature point location, a pair of sample point indexes for each pair of sample points, a number of sample point pairs involved in each orientation determination, a Q value, a number of mantissa bits and an accuracy.

Example 12

This example includes the elements according to any one of examples 1 through 4, wherein the optimization circuitry is to receive feature data, the feature data selected from the group including a feature identifier, a feature point location and a feature point scale.

Example 13

According to this example there is provided a method. The method includes determining, by a feature extraction circuitry, a feature descriptor based, at least in part, on a feature point location and a corresponding scale. The method further includes optimizing, by an optimization circuitry, an operation of the feature extraction circuitry. Each optimization is to at least one of accelerate the operation of the feature extraction circuitry, reduce a power consumption of the feature extraction circuitry and/or reduce a system memory bandwidth used by the feature extraction circuitry.

Example 14

This example includes the elements of example 13, further including determining, by an integral circuitry, an integral image of a feature patch associated with the feature point location; and configuring, by the optimization circuitry, the integral circuitry to determine each integral image value utilizing a register, a line buffer and two addition operations.

Example 15

This example includes the elements of example 13, further including determining, by the optimization circuitry, whether a spatial locality exists between a plurality of feature points.

Example 16

This example includes the elements of example 13, further including determining, by a sample point (SP) intensity circuitry, a pixel intensity of a square sample point region associated with a sample point; and configuring, by the optimization circuitry, the SP intensity circuitry to smooth the intensity of the square sample point region using a box filter.

Example 17

This example includes the elements of example 16, further including adjusting, by the optimization circuitry, a location of the sample point based, at least in part, on an orientation of a feature patch associated with the feature point location, utilizing an orientation vector.

Example 18

This example includes the elements of example 13, further including configuring, by the optimization circuitry, the feature extraction circuitry to determine the feature descriptor utilizing intermediate floating-point precision.

Example 19

This example includes the elements of example 13, further including sorting, by the optimization circuitry, a plurality of pairs of sample points according to an index of a sample point of each pair.

Example 20

This example includes the elements of example 14, further including configuring, by the optimization circuitry, the integral circuitry to store a selected integral image value to an image cache.

Example 21

This example includes the elements of example 16, further including predicting, by the optimization circuitry, an adjusted sample point location.

Example 22

This example includes the elements of example 13, wherein the feature extraction circuitry at least one of complies and/or is compatible with a feature extraction technique selected from the group including FREAK (Fast Retina Keypoint), BRISK (Binary Robust Invariant Scalable Keypoints), BRIEF (Binary Robust Independent Elementary Features) and ORB (Oriented Fast and Rotated BRIEF).

Example 23

This example includes the elements of example 13, further including receiving, by the optimization circuitry, feature configuration data, the feature configuration data selected from the group including a sample point size, a location of each sample point relative to a corresponding feature point location, a pair of sample point indexes for each pair of sample points, a number of sample point pairs involved in each orientation determination, a Q value, a number of mantissa bits and an accuracy.

Example 24

This example includes the elements of example 13, further including receiving, by the optimization circuitry, feature data, the feature data selected from the group including a feature identifier, a feature point location and a feature point scale.

Example 25

According to this example there is provided an image feature system. The image feature system includes a processor circuitry; a system memory; and an image processing circuitry. The image processing circuitry includes a feature extraction circuitry and an optimization circuitry. The feature extraction circuitry is to determine a feature descriptor based, at least in part, on a feature point location and a corresponding scale. The optimization circuitry is to optimize an operation of the feature extraction circuitry. Each optimization is to at least one of accelerate the operation of the feature extraction circuitry, reduce a power consumption of the feature extraction circuitry and/or reduce a system memory bandwidth used by the feature extraction circuitry.

Example 26

This example includes the elements of example 25, wherein the feature extraction circuitry includes an integral circuitry to determine an integral image of a feature patch associated with the feature point location, the optimization circuitry to configure the integral circuitry to determine each integral image value utilizing a register, a line buffer and two addition operations.

Example 27

This example includes the elements of example 25, wherein the optimization circuitry is to determine whether a spatial locality exists between a plurality of feature points.

Example 28

This example includes the elements of example 25, wherein the feature extraction circuitry includes a sample point (SP) intensity circuitry to determine a pixel intensity of a square sample point region associated with a sample point, the optimization circuitry to configure the SP intensity circuitry to smooth the intensity of the square sample point region using a box filter.

Example 29

This example includes the elements of example 28, wherein the optimization circuitry is to adjust a location of the sample point based, at least in part, on an orientation of a feature patch associated with the feature point location, utilizing an orientation vector.

Example 30

This example includes the elements according to any one of examples 25 through 28, wherein the optimization circuitry is to configure the feature extraction circuitry to determine the feature descriptor utilizing intermediate floating-point precision.

Example 31

This example includes the elements according to any one of examples 25 through 28, wherein the optimization circuitry is to sort a plurality of pairs of sample points according to an index of a sample point of each pair.

Example 32

This example includes the elements of example 26, wherein the optimization circuitry is to configure the integral circuitry to store a selected integral image value to an image cache.

Example 33

This example includes the elements of example 28, wherein the optimization circuitry is to predict an adjusted sample point location.

Example 34

This example includes the elements according to any one of examples 25 through 28, wherein the feature extraction circuitry at least one of complies and/or is compatible with a feature extraction technique selected from the group including FREAK (Fast Retina Keypoint), BRISK (Binary Robust Invariant Scalable Keypoints), BRIEF (Binary Robust Independent Elementary Features) and ORB (Oriented Fast and Rotated BRIEF).

Example 35

This example includes the elements according to any one of examples 25 through 28, wherein the optimization circuitry is to receive feature configuration data, the feature configuration data selected from the group including a sample point size, a location of each sample point relative to a corresponding feature point location, a pair of sample point indexes for each pair of sample points, a number of sample point pairs involved in each orientation determination, a Q value, a number of mantissa bits and an accuracy.

Example 36

This example includes the elements according to any one of examples 25 through 28, wherein the optimization circuitry is to receive feature data, the feature data selected from the group including a feature identifier, a feature point location and a feature point scale.

Example 37

This example includes the elements according to any one of examples 25 through 28, wherein the processor circuitry is selected from the group including a general purpose processor, a special purpose processor, a graphics processing unit, a digital signal processing unit, a vector processing unit, a microcontroller and a finite state machine microcontroller.

Example 38

This example includes the elements according to any one of examples 25 through 28, wherein the image processing circuitry includes an image cache.

Example 39

This example includes the elements of example 26, wherein the integral image circuitry includes the line buffer, the register and two adder circuitries.

Example 40

According to this example there is provided a computer readable storage device. The pewter readable storage device has stored thereon instructions that when executed by one or more processors result in the following operations including determining a feature descriptor based, at least in part, on a feature point location and a corresponding scale; and optimizing an operation of the feature extraction circuitry. Each optimization is to at least one of accelerate the operation of the feature extraction circuitry, reduce a power consumption of the feature extraction circuitry and/or reduce a system memory bandwidth used by the feature extraction circuitry.

Example 41

This example includes the elements of example 40, wherein the instructions that when executed by one or more processors results in the following additional operations including determining an integral image of a feature patch associated with the feature point location; and configuring an integral circuitry to determine each integral image value utilizing a register, a line buffer and two addition operations.

Example 42

This example includes the elements of example 40, wherein the instructions that when executed by one or more processors results in the following additional operations including determining whether a spatial locality exists between a plurality of feature points.

Example 43

This example includes the elements of example 40, wherein the instructions that when executed by one or more processors results in the following additional operations including determining a pixel intensity of a square sample point region associated with a sample point; and configuring a sample point (SP) intensity circuitry to smooth the intensity of the square sample point region using a box filter.

Example 44

This example includes the elements of example 43, wherein the instructions that when executed by one or more processors results in the following additional operations including adjusting a location of the sample point based, at least in part, on an orientation of a feature patch associated with the feature point location, utilizing an orientation vector.

Example 45

This example includes the elements according to any one of examples 40 through 43, wherein the instructions that when executed by one or more processors results in the following additional operations including configuring the feature extraction circuitry to determine the feature descriptor utilizing intermediate floating-point precision.

Example 46

This example includes the elements according to any one of examples 40 through 43, wherein the instructions that when executed by one or more processors results in the following additional operations including sorting a plurality of pairs of sample points according to an index of a sample point of each pair.

Example 47

This example includes the elements of example 41, wherein the instructions that when executed by one or more processors results in the following additional operations including configuring the integral circuitry to store a selected integral image value to an image cache.

Example 48

This example includes the elements of example 43, wherein the instructions that when executed by one or more processors results in the following additional operations including predicting an adjusted sample point location.

Example 49

This example includes the elements according to any one of examples 40 through 43, wherein the feature extraction circuitry at least one of complies and/or is compatible with a feature extraction technique selected from the group including FREAK (Fast Retina Keypoint), BRISK (Binary Robust Invariant Scalable Keypoints), BRIEF (Binary Robust Independent Elementary Features) and ORB (Oriented Fast and Rotated BRIEF).

Example 50

This example includes the elements according to any one of examples 40 through 43, wherein the instructions that when executed by one or more processors results in the following additional operations including receiving feature configuration data, the feature configuration data selected from the group including a sample point size, a location of each sample point relative to a corresponding feature point location, a pair of sample point indexes for each pair of sample points, a number of sample point pairs involved in each orientation determination, a Q value, a number of mantissa bits and an accuracy.

Example 51

This example includes the elements according to any one of examples 40 through 43, wherein the instructions that when executed by one or more processors results in the following additional operations including receiving feature data, the feature data selected from the group including a feature identifier, a feature point location and a feature point scale.

Example 52

According to this example there is provided an image processing device. The image processing device includes means for determining, by a feature extraction circuitry, a feature descriptor based, at least in part, on a feature point location and a corresponding scale. The device further includes means for optimizing, by an optimization circuitry, an operation of the feature extraction circuitry. Each optimization is to at least one of accelerate the operation of the feature extraction circuitry, reduce a power consumption of the feature extraction circuitry and/or reduce a system memory bandwidth used by the feature extraction circuitry.

Example 53

This example includes the elements of example 52, further including means for determining, by an integral circuitry, an integral image of a feature patch associated with the feature point location; and means for configuring, by the optimization circuitry, the integral circuitry to determine each integral image value utilizing a register, a line buffer and two addition operations.

Example 54

This example includes the elements of example 52, further including means for determining, by the optimization circuitry, whether a spatial locality exists between a plurality of feature points.

Example 55

This example includes the elements of example 52, further including means for determining, by a sample point (SP) intensity circuitry, a pixel intensity of a square sample point region associated with a sample point; and means for configuring, by the optimization circuitry, the SP intensity circuitry to smooth the intensity of the square sample point region using a box filter.

Example 56

This example includes the elements of example 55, further including means for adjusting, by the optimization circuitry, a location of the sample point based, at least in part, on an orientation of a feature patch associated with the feature point location, utilizing an orientation vector.

Example 57

This example includes the elements according to any one of examples 52 through 55, further including means for configuring, by the optimization circuitry, the feature extraction circuitry to determine the feature descriptor utilizing intermediate floating-point precision.

Example 58

This example includes the elements according to any one of examples 52 through 55, further including means for sorting, by the optimization circuitry, a plurality of pairs of sample points according to an index of a sample point of each pair.

Example 59

This example includes the elements of example 53, further including means for configuring, by the optimization circuitry, the integral circuitry to store a selected integral image value to an image cache.

Example 60

This example includes the elements of example 55, further including means for predicting, by the optimization circuitry, an adjusted sample point location.

Example 61

This example includes the elements according to any one of examples 52 through 55, wherein the feature extraction circuitry at least one of complies and/or is compatible with a feature extraction technique selected from the group including FREAK (Fast Retina Keypoint), BRISK (Binary Robust Invariant Scalable Keypoints), BRIEF (Binary Robust Independent Elementary Features) and ORB (Oriented Fast and Rotated BRIEF).

Example 62

This example includes the elements according to any one of examples 52 through 55, further including means for receiving, by the optimization circuitry, feature configuration data, the feature configuration data selected from the group including a sample point size, a location of each sample point relative to a corresponding feature point location, a pair of sample point indexes for each pair of sample points, a number of sample point pairs involved in each orientation determination, a Q value, a number of mantissa bits and an accuracy.

Example 63

This example includes the elements according to any one of examples 52 through 55, further including means for receiving, by the optimization circuitry, feature data, the feature data selected from the group including a feature identifier, a feature point location and a feature point scale.

Example 64

According to this example there is provided a system. The system includes at least one device arranged to perform the method of any one of examples 13 to 24.

Example 65

According to this example there is provided a device. The device includes means to perform the method of any one of examples 13 to 24.

Example 66

According to this example there is provided a computer readable storage device. The computer readable storage device has stored thereon instructions that when executed by one or more processors result in the following operations including: the method according to any one of examples 13 through 24.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An image processing circuitry comprising:
    a feature extraction circuitry to determine a feature descriptor based, at least in part, on a feature point location and a corresponding scale; and
    an optimization circuitry to optimize an operation of the feature extraction circuitry, each optimization to at least one of accelerate the operation of the feature extraction circuitry, reduce a power consumption of the feature extraction circuitry and/or reduce a system memory bandwidth used by the feature extraction circuitry;
    wherein:
        the feature extraction circuitry comprises an integral image circuitry to determine an integral image of a feature patch associated with the feature point location, a sample point (SP) intensity circuitry to determine a pixel intensity of a square sample point region associated with a sample point, or a combination thereof;
        when the feature extraction circuitry comprises said integral image circuitry, said optimization circuitry is to configure the integral image circuitry to determine each integral image value utilizing a register, a line buffer and two addition operations; and
        when the feature extraction circuitry comprises said SP intensity circuitry, said optimization circuitry is to configure the SP intensity circuitry to smooth the intensity of the square sample point region using a box filter.

2. The image processing circuitry of claim 1, wherein the optimization circuitry is to determine whether a spatial locality exists between a plurality of feature points.

3. The image processing circuitry of claim 1, wherein the feature extraction circuitry comprises said SP intensity circuitry, and said optimization circuitry is to adjust a location of the sample point based, at least in part, on an orientation of a feature patch associated with the feature point location, utilizing an orientation vector.

4. The image processing circuitry of claim 1, wherein the optimization circuitry is to sort a plurality of pairs of sample points according to an index of a sample point of each pair.

5. The image processing circuitry of claim 1, wherein the feature extraction circuitry comprises said integral image circuitry, and said optimization circuitry is to configure the integral image circuitry to store a selected integral image value to an image cache.

6. The image processing circuitry of claim 1, wherein the optimization circuitry is to configure the feature extraction circuitry to determine the feature descriptor utilizing intermediate floating-point precision.

7. A method comprising:
    determining, by a feature extraction circuitry, a feature descriptor based, at least in part, on a feature point location and a corresponding scale; and
    optimizing, by an optimization circuitry, an operation of the feature extraction circuitry, each optimization to at least one of accelerate the operation of the feature extraction circuitry, reduce a power consumption of the feature extraction circuitry and/or reduce a system memory bandwidth used by the feature extraction circuitry;

wherein:

the feature extraction circuitry comprises an integral image circuitry, a sample point (SP) intensity circuitry, or a combination thereof, and the method further comprises:

when the feature extraction circuitry comprises said integral image circuitry, determining, with the integral image circuitry, an integral image of a feature patch associated with the feature point location, and configuring, by the optimization circuitry, the integral image circuitry to determine each integral image value utilizing a register, a line buffer and two addition operations; and when the feature extraction circuitry comprises said SP intensity circuitry, determining, by said SP intensity circuitry, a pixel intensity of a square sample point region associated with a sample point; and configuring, by the optimization circuitry, the SP intensity circuitry to smooth the intensity of the square sample point region using a box filter.

8. The method of claim 7, further comprising determining, by the optimization circuitry, whether a spatial locality exists between a plurality of feature points.

9. The method of claim 7, wherein the feature extraction circuitry comprises said SP intensity circuitry, and the method further comprises further comprising adjusting, by the optimization circuitry, a location of the sample point based, at least in part, on an orientation of a feature patch associated with the feature point location, utilizing an orientation vector.

10. The method of claim 7, further comprising sorting, by the optimization circuitry, a plurality of pairs of sample points according to an index of a sample point of each pair.

11. The method of claim 7, wherein the feature extraction circuitry comprises said integral image circuitry, and the method further comprises configuring, by the optimization circuitry, the integral image circuitry to store a selected integral image value to an image cache.

12. The method of claim 7, further comprising configuring, by the optimization circuitry, the feature extraction circuitry to determine the feature descriptor utilizing intermediate floating-point precision.

13. An image feature system comprising:
a processor circuitry;
a system memory; and
an image processing circuitry comprising:
a feature extraction circuitry to determine a feature descriptor based, at least in part, on a feature point location and a corresponding scale; and
an optimization circuitry to optimize an operation of the feature extraction circuitry, each optimization to at least one of accelerate the operation of the feature extraction circuitry, reduce a power consumption of the feature extraction circuitry and/or reduce a system memory bandwidth used by the feature extraction circuitry;

wherein:

the feature extraction circuitry comprises an integral image circuitry to determine an integral image of a feature patch associated with the feature point location, a sample point (SP) intensity circuitry to determine a pixel intensity of a square sample point region associated with a sample point, or a combination thereof;

when the feature extraction circuitry comprises said integral image circuitry, determining, with the integral image circuitry, an integral image of a feature patch associated with the feature point location, and configuring, by the optimization circuitry, the integral image circuitry to determine each integral image value utilizing a register, a line buffer and two addition operations;

when the feature extraction circuitry comprises said SP intensity circuitry, determining, by said SP intensity circuitry, a pixel intensity of a square sample point region associated with a sample point; and configuring, by the optimization circuitry, the SP intensity circuitry to smooth the intensity of the square sample point region using a box filter.

14. The image feature system of claim 13, wherein the optimization circuitry is to determine whether a spatial locality exists between a plurality of feature points.

15. The image feature system of claim 13, wherein the feature extraction circuitry comprises said SP intensity circuitry, and the optimization circuitry is to adjust a location of the sample point based, at least in part, on an orientation of a feature patch associated with the feature point location, utilizing an orientation vector.

16. The image feature system of claim 13, wherein the optimization circuitry is to sort a plurality of pairs of sample points according to an index of a sample point of each pair.

17. The image feature system of claim 13, wherein the feature extraction circuitry comprises said integral image circuitry, and the optimization circuitry is to configure the integral image circuitry to store a selected integral image value to an image cache.

18. The image feature system of claim 13, wherein the processor circuitry is selected from the group comprising a general purpose processor, a special purpose processor, a graphics processing unit, a digital signal processing unit, a vector processing unit, a microcontroller and a finite state machine microcontroller.

19. The image feature system of claim 13, wherein the optimization circuitry is to configure the feature extraction circuitry to determine the feature descriptor utilizing intermediate floating-point precision.

* * * * *